United States Patent
Takakura

(10) Patent No.: US 9,477,618 B2
(45) Date of Patent: Oct. 25, 2016

(54) INFORMATION PROCESSING DEVICE, INFORMATION PROCESSING SYSTEM, STORAGE MEDIUM STORING PROGRAM FOR CONTROLLING INFORMATION PROCESSING DEVICE, AND METHOD FOR CONTROLLING INFORMATION PROCESSING DEVICE

(71) Applicant: FUJITSU LIMITED, Kawasaki-shi, Kanagawa (JP)

(72) Inventor: Hideki Takakura, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/618,044

(22) Filed: Feb. 10, 2015

(65) Prior Publication Data

US 2015/0278127 A1 Oct. 1, 2015

(30) Foreign Application Priority Data

Mar. 31, 2014 (JP) ................. 2014-072265

(51) Int. Cl.
*G06F 12/00* (2006.01)
*G06F 13/16* (2006.01)
*G06F 12/10* (2016.01)
*G06F 3/06* (2006.01)

(52) U.S. Cl.
CPC .......... *G06F 13/1642* (2013.01); *G06F 3/061* (2013.01); *G06F 3/0659* (2013.01); *G06F 3/0676* (2013.01); *G06F 12/1018* (2013.01); *G06F 3/067* (2013.01); *G06F 2212/657* (2013.01)

(58) Field of Classification Search
CPC .. G06F 13/1642; G06F 3/061; G06F 3/0659; G06F 3/067; G06F 3/0676; G06F 12/1018; G06F 2212/657
See application file for complete search history.

(56) References Cited

U.S. PATENT DOCUMENTS

| 6,289,383 B1 | 9/2001 | Rhine | |
|---|---|---|---|
| 2006/0080457 A1 | 4/2006 | Hiramatsu et al. | |
| 2009/0248917 A1* | 10/2009 | Kalos | G06F 3/061 710/39 |
| 2010/0037231 A1 | 2/2010 | Chen et al. | |

FOREIGN PATENT DOCUMENTS

| JP | 2000-172541 | 6/2000 |
|---|---|---|
| JP | 2002-358259 | 12/2002 |
| JP | 2006-67401 | 3/2006 |
| JP | 2007-188452 | 7/2007 |
| JP | 2010-152435 | 7/2010 |

OTHER PUBLICATIONS

Extended European Search Report dated Aug. 27, 2015 in corresponding European Patent Application No. 15155151.2.

* cited by examiner

*Primary Examiner* — Shawn X Gu
(74) *Attorney, Agent, or Firm* — Staas & Halsey LLP

(57) ABSTRACT

An information processing device, comprising: a memory; and one or more central processing units coupled to the memory and configured to: control accesses to a device based on requests from users, record a start time of each access to the device and an end time of the access to the device, determine a load state of the device based on an elapsed time period from the start time to the end time, and limit, based on the load state of the device, a number of threads for one of the users, the threads being concurrently executed to access the device based on access requests to the device from the one of the users.

9 Claims, 19 Drawing Sheets

FIG. 5

| OFFSET | DESCRIPTION |
|---|---|
| 0 | REQUEST TYPE (WRITE) |
| 8 | USER ID |
| 16 | SIZE OF DATA TO BE WRITTEN |
| 24 | DATA TO BE WRITTEN |

FIG. 10

| START TIME OF DISK ACCESS | END TIME OF DISK ACCESS | ELAPSED TIME PERIOD | NUMBER OF TIMES OF ACCESS EXECUTED IN PARALLEL |
|---|---|---|---|
| 1377993600.153960 | 1377993600.184260 | 0.030298 | 2 |
| 1377993600.168420 | 1377993600.194230 | 0.025819 | 2 |
| 1377993601.111370 | 1377993601.132590 | 0.021219 | 1 |
| 1377993602.153080 | 1377993602.211390 | 0.058311 | 3 |
| 1377993602.155130 | 1377993602.215570 | 0.060431 | 3 |
| 1377993602.156170 | 1377993602.219690 | 0.063521 | 3 |

| 1301 | 1302 | 1303 |

| NUMBER OF TIMES OF ACCESS EXECUTED IN PARALLEL | AVERAGE OF ELAPSED TIME PERIODS | RATIO OF AVERAGE OF ELAPSED TIME PERIODS TO AVERAGE OF ELAPSED TIME PERIODS IN WHICH NUMBER OF TIMES OF ACCESS EXECUTED IN PARALLEL IS 1 |
|---|---|---|
| 1 | 0.021219 | 1 TIME |
| 2 | 0.0280585 | 1.32 TIMES |
| 3 | 0.0607543 | 2.86 TIMES |

FIG. 13B

| NUMBER OF TIMES OF ACCESS EXECUTED IN PARALLEL | AVERAGE OF ELAPSED TIME PERIODS | RATIO OF AVERAGE OF ELAPSED TIME PERIODS TO AVERAGE OF ELAPSED TIME PERIODS IN WHICH NUMBER OF TIMES OF ACCESS EXECUTED IN PARALLEL IS 1 |
|---|---|---|
| 1 | 0.021219 | 1 TIME |
| 2 | 0 | -- |
| 3 | 0 | -- |
| 4 | 0.0802534 | 3.78 TIMES |

FIG. 13C

| NUMBER OF TIMES OF ACCESS EXECUTED IN PARALLEL | AVERAGE OF ELAPSED TIME PERIODS | RATIO OF AVERAGE OF ELAPSED TIME PERIODS TO AVERAGE OF ELAPSED TIME PERIODS IN WHICH NUMBER OF TIMES OF ACCESS EXECUTED IN PARALLEL IS 1 |
|---|---|---|
| 1 | 0.021219 | 1 TIME |
| 2 | 0.0280585 | 1.32 TIMES |

INFORMATION PROCESSING DEVICE, INFORMATION PROCESSING SYSTEM, STORAGE MEDIUM STORING PROGRAM FOR CONTROLLING INFORMATION PROCESSING DEVICE, AND METHOD FOR CONTROLLING INFORMATION PROCESSING DEVICE

CROSS-REFERENCE TO RELATED APPLICATION

This application is based upon and claims the benefit of priority of the prior Japanese Patent Application No. 2014-072265 filed on Mar. 31, 2014, the entire contents of which are incorporated herein by reference.

FIELD

The embodiments discussed herein are related to an information processing device configured to control access to a device based on a request from a user, an information processing system, a storage medium storing a program for controlling an information processing device, and a method for controlling an information processing device.

BACKGROUND

In a distributed file system such as a network file system (NFS), when a file is accessed from many client machines concurrently, a high load may be applied to a server machine and the rate of the access to the file may be significantly reduced. This is mainly due to the fact that a disk wait period increases due to a conflict in access to a disk device connected to the server machine.

As a technique for controlling access to a file, the following technique is known. A percentage to be used is assigned to each of users, and factors of all applications to be executed by the users are determined. The factors are associated with requests to search data from an arbitrary application. Times to start the requests to search the data are calculated for batches of the data requests in accordance with the associated factors. As a result, the times to start the requests by all users corresponding to the batches are aligned based on the calculated start times. A system readjusts the start times in order for the system to efficiently operate (for example, a technique described in Japanese Laid-Open Patent Publication No. 2000-172541).

A multiplicity is set for each data managing device. A data managing device with a high multiplicity processes a large number of search requests concurrently and processes each search request for a long time, while a data managing device with a low multiplicity processes a smaller number of search requests concurrently and processes each search request for a short time. A service server estimates a processing time for each of search requests from a user terminal, assigns a search request to be processed for a long time to the data managing device with the high multiplicity, assigns a search request to be processed for a short time to the data managing device with the low multiplicity, and thereby improves the efficiency of a search request process. The search request to be processed for the short time is processed and completed by the data managing device with the high multiplicity for the short time. Even if the number of search requests to be concurrently processed is too large, a time for processing the search requests is not too long, compared with the case where the search requests are not concurrently processed, and the number of search requests to be concurrently processed in an overall system increases (for example, a technique described in Japanese Laid-Open Patent Publication No. 2010-152435).

In addition, as techniques for controlling access to a file, there are techniques described in Japanese Laid-Open Patent Publications Nos. 2002-358259, 2006-067401, and 2007-188452, for example.

In the distributed file system, a time for each access may be longer by multiple times than a time for independently executed access. Thus, fairness between users may not be secured, especially when a high load is applied.

SUMMARY

According to an aspect of the invention, an information processing device, comprising: a memory; and one or more central processing units coupled to the memory and configured to: control accesses to a device based on requests from users, record a start time of each access to the device and an end time of the access to the device, determine a load state of the device based on an elapsed time period from the start time to the end time, and limit, based on the load state of the device, a number of threads for one of the users, the threads being concurrently executed to access the device based on access requests to the device from the one of the users.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a diagram illustrating an example of a data format of a request;

FIG. 10 is a diagram illustrating an example of a data configuration of an aggregation table;

FIGS. 13A, 13B, and 13C are diagrams illustrating an example of a data configuration of another aggregation table;

DESCRIPTION OF EMBODIMENTS

In a distributed file system, when a disk device is accessed in concurrent from many points, a processing time per each access is longer by multiple times than a processing time for independently executed access, and thus a response may be delayed. Thus, when a high load is applied, processing of a small amount (IO amount) of data to be input and output in accordance with an operation by a user may be significantly delayed due to processing of a large amount (IO amount) of data to be input and output in accordance with an operation by another user. Thus, fairness between the users may be secured.

Hereinafter, first to third embodiments are described with reference to the accompanying drawings.

Figure 1:
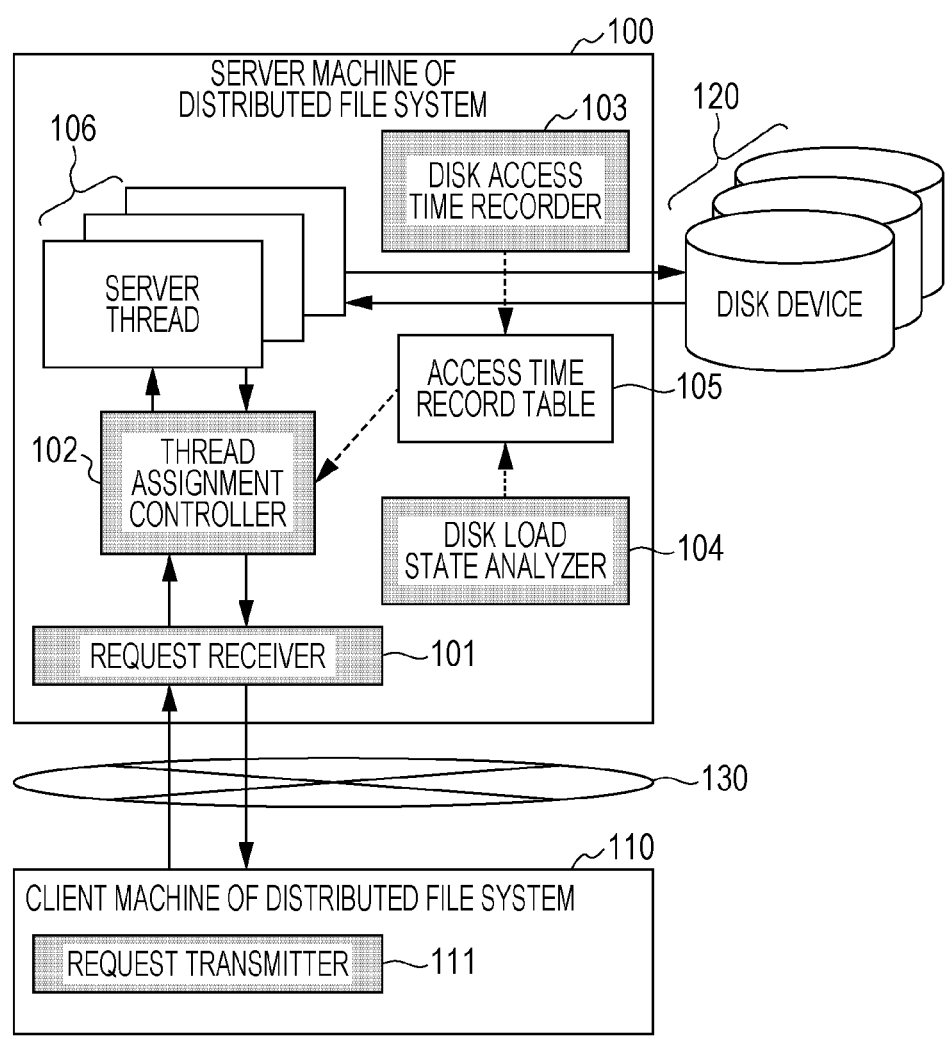
FIG. 1 is a diagram illustrating a configuration of a distributed file system according to first to third embodiments.

FIG. 1 is a diagram illustrating a configuration of a distributed file system according to the first to third embodiments. The distributed file system includes a server machine 100 configured to access, in a shared manner, a disk device 120 that is an external storage device with a RAID system, for example. The distributed file system includes at least one client machine 110 connected to the server machine 100 through a network 130 such as a local area network (LAN) or the Internet, for example. The client machine 110 issues, to the server machine 100, a request to access the disk device 120. The request is a request to write file data in the disk device 120, a request to read file data from the disk device 120, or the like, for example.

The server machine 100 includes a request receiver 101, a thread assignment controller 102, a disk access time recorder 103, a disk load state analyzer 104, an access time record table 105, and server threads 106. The client machine 110 includes a request transmitter 111.

The disk access time recorder (access recorder) 103 records start times of access to the disk device (device) 120 and end times of the access to the disk device 120 in the access time record table 105 stored in a memory of the server machine 100, for example. When multiple requests to execute access are provided from users, the disk access time recorder 103 records start times of the access and end times of the access in the access time record table 105, for example.

The disk load state analyzer (load state analyzer) 104 determines a load state of the disk device 120 based on elapsed time periods from the start times recorded in the access time record table 105 to the end times recorded in the access time record table 105, for example.

The thread assignment controller 102 limits, based on the load state of the disk device 120 to be accessed based on a request from a user, the number of threads that are concurrently executed to access the disk device 120. The request is transmitted from the request transmitter 111 included in the client machine 110 operated by the user, received by the request receiver 101 included in the server machine 100 through the network 130, and transferred to the thread assignment controller 102, for example. The thread assignment controller 102 limits the number of server threads 106 that are concurrently executed on the server machine 100 for each user in order to access the disk device 120.

According to the aforementioned configuration, the disk load state analyzer 104 may dynamically analyze the load state of the disk device 120 based on a change of the state of the disk device 120. The state of the disk device (device) 120 is, for example, the number of times of access and may cause a temporal change of response performance and the like of the disk device 120. In the first embodiment, concurrent access control that is fair for the users is achieved by limiting, based on load states calculated for temporally changing states of the disk device 120, the number of threads that are concurrently executed to access the disk device 120 based on the request from the user. This is due to the fact that it is possible to calculate the number (number of times of concurrently executable access), suppressing a delay of access with respect to a time to access the disk device 120, of times of access executed in concurrent.

In the aforementioned configuration, the request receiver 101 may divide a data size of a request transmitted from the client machine 110 into certain sizes causing time periods for access to the disk device 120 to be within certain time periods and issue, to the disk device 120, requests to access the disk device 120. This control inhibits a variation in the time periods for the access. The certain time periods are each approximately 10 milliseconds, for example. The certain sizes are each equal to a block size of a file system of the disk device 120, for example.

The disk access time recorder 103 counts, for each access issued by server threads 106, the number of times of the interested and other access, issued by server threads 106 and executed in concurrent, to the disk device 120 for the interested access for each of the certain time periods within an elapsed time period for the interested access from a start time of the access issued by a server thread 106 and an end time of the access issued by the server thread 106. The disk access time recorder 103 calculates, for each access, an average of the numbers of times of the access executed in concurrent within the overall elapsed time period for the interested access based on the counted number of times of the access executed in concurrent for each of the certain time periods and thereby calculates, for each access, the number of the times of the access executed in concurrent within the overall elapsed time period for the interested access, for example.

The disk load state analyzer 104 calculates the number of times of concurrently executable access when the total of the numbers of times of access executed in concurrent within an elapsed time period for each access becomes a certain value. For example, the disk load state analyzer 104 compares an elapsed time period for independently executed access with elapsed time periods for access executed in concurrent among the time periods for the access and determines, as the number of times of concurrently executable access, the number of times of access executed in concurrent within an elapsed time period that is equal to or shorter than N (N>0) times of the elapsed time period for the independently executed access among the numbers of times of access executed in concurrent. Specifically, the disk load state analyzer 104 determines the load state of the disk device 120 by determining the number of times of concurrently executable access. The disk load state analyzer 104 may appropriately detect temporally changing load states of disks by repeating the analysis of the load state at certain time intervals.

The thread assignment controller 102 limits the number of concurrently executed server threads 106 so as to ensure that the number of the concurrently executed server threads 106 does not exceed the number of times of concurrently executable access.

After the disk load state analyzer 104 determines the number of times of concurrently executable access, records of the access time record table 105 are cleared. Then, the thread assignment controller 102 limits, based on the determined number of times of concurrently executable access, the number of concurrently executed server threads 106. The disk access time recorder 103 restarts recording an access time period in the access time record table 105 for each access and calculates, for each access, the number of times of access executed in concurrent within an elapsed time period for the interested access. When the total of the numbers of times of access executed in concurrent within an elapsed time period for each access becomes the certain value again, the disk load state analyzer 104 aggregates the elapsed time periods for the numbers of the times of the access executed in concurrent and recalculates the number of times of concurrently executable access based on the result of the aggregation. Even if a delay of disk access is not reduced by calculating the number of times of concurrently executable access once, the load state of the disk device 120 may be more accurately determined by calculating the number of times of concurrently executable access multiple times.

In this manner, concurrent access control that is executed based on a change in the state of the disk device 120 and is fair for the users is achieved by repeating the calculation of the number of times of concurrently executable access. Access fairness between the users is secured by controlling time periods for access and thereby causing the time periods for the access to be equal to or shorter than N times of the elapsed time period of independently executed access. Specifically, when the number of executed threads does not exceed the total number of executed threads accepted by the system, the number of times of access executed in concurrent for each user is limited and the number of threads for a user who causes a high load is limited. Thus, even a user who causes a low load may access the disk device 120 and thus the fairness may be achieved. The state of the disk device 120 includes the aforementioned number of times of access from the user, failure statuses of disks forming the RAID system, the type of the request causing the access, and the like. In the first embodiment, the number (number of concurrently executed threads) of executed threads is limited, and thus an increase in a processing time per each access is suppressed. Thus, the occurrence of a delay of a response by the file system may be suppressed.

Figure 2:
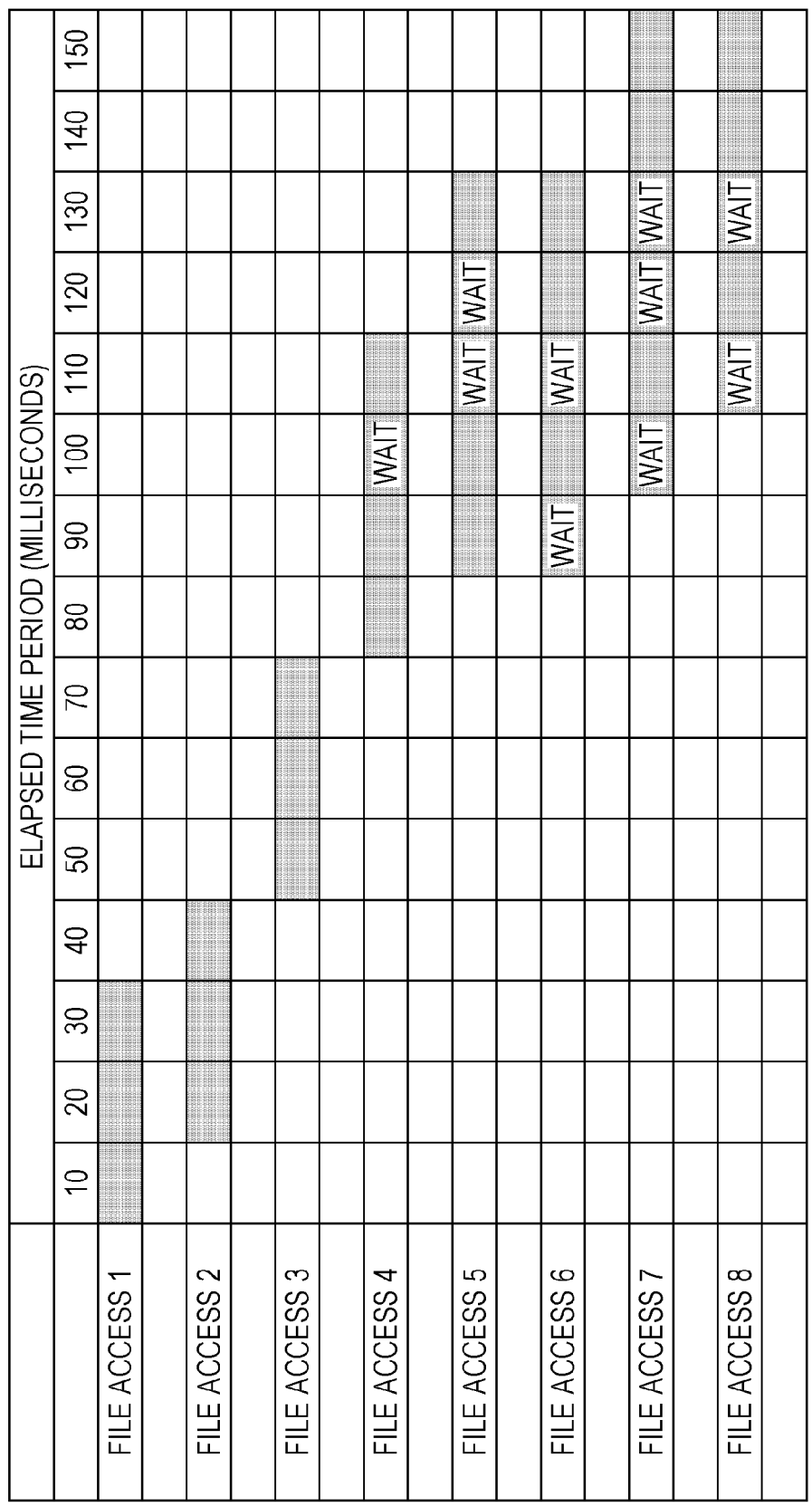
FIG. 2 is a diagram illustrating a specific example of the calculation of the number of times of file access executed in parallel for each of elapsed time periods.

FIG. 2 is a diagram illustrating a specific example of the calculation of the number of times of access executed in concurrent for each of elapsed time periods for file access by the disk access time recorder 103. This example assumes that the lengths of all data are equal to each other.

In the example illustrated in FIG. 2, after a time of 10 milliseconds elapses after the start of the execution of file access 1, the execution of file access 2 is started with a cross call. The number of times of file access executed in concurrent for a time period from 0 to 10 milliseconds is 1, the number of times of file access executed in concurrent for a time period from 10 milliseconds to 30 milliseconds is 2, and the number of times of file access executed in concurrent for a time period from 30 milliseconds to 40 milliseconds is 1. An elapsed time period for the file access 1 is 30 milliseconds. An average of the numbers of times of file access executed in concurrent for time periods from 0 to 30 milliseconds is calculated according to the following equation, while the time periods are each 10 milliseconds.

The average of the numbers of times of access executed in concurrent for the file access $1=(1+2+2)/3=1.67$ and the elapsed time period for the file access 1 is 30 milliseconds.

Similarly, an average of the numbers of times of access executed in concurrent for file access $2=(2+2+1)/3=1.67$ and an elapsed time period for the file access 2 is 30 milliseconds.

An average of the numbers of times of access executed in concurrent for the file access $3=(1+1+1)/3=1$ and an elapsed time period for the file access 3 is 30 milliseconds.

An average of the numbers of times of access executed in concurrent for a file access $4=(1+3+4+5)/4=3.25$ and an elapsed time period for the file access 4 is 40 milliseconds.

An average of the numbers of times of access executed in concurrent for a file access $5=(3+4+5+4+4)/5=4$ and an elapsed time period for the file access 5 is 50 milliseconds.

An average of the numbers of times of access executed in concurrent for a file access $6=(3+4+5+4+4)/5=4$ and an elapsed time period for the file access 6 is 50 milliseconds.

An average of the numbers of times of access executed in concurrent for a file access $7=(4+5+4+4+2+2)/6=3.5$ and an elapsed time period for the file access 7 is 60 milliseconds.

An average of the numbers of times of access executed in concurrent for a file access $8=(5+4+4+2+2)/5=3.4$ and an elapsed time period for the file access 8 is 50 milliseconds. Equations (1)

In the example illustrated in FIG. 2, the calculated average of the numbers of times of access executed in concurrent for the file access 3 is 1, and the file access 3 is independently executed (or is not executed in concurrent with other file access) for the elapsed time period for the file access 3 as illustrated in FIG. 2. In the example illustrated in FIG. 2, if it is assumed that the number of times of access to be processed in parallel in the disk device 120 with a cross call is up to 2, the request receiver 101 keeps file access waiting in a request queue on a memory managed by the request receiver 101 for time periods, indicated by "wait" in FIG. 2, of 10 milliseconds. Thus, the elapsed time periods for the file access 4 to 8 are each longer than the original time period of 30 milliseconds.

In the aforementioned calculation example of Equations (1) for the file access 1 to 8, a correlation between an average of the numbers of times of access executed in concurrent for interested access and an elapsed time period for the interested access may be obtained. According to the correlation, when the average of the numbers of times of access executed in concurrent for the interested access increases and exceeds the number of times of concurrently executable access accepted by the system, and the number of times of access kept waiting increases, an elapsed time period for the interested access increases. For example, it is sufficient if the following control is executed based on the correlation in order to suppress an increase in a delay of access to the disk device 120. It is sufficient if the numbers of times of access, executed in concurrent, to the disk device 120 are controlled so as to ensure that elapsed time periods for the access are equal to or shorter than N times of the elapsed time period for independently executed access or N times of the elapsed time period in which the number of times of access executed in concurrent is 1. In this case, N is 1.5, 2, or the like, for example.

In general, when the number of times of access, executed in concurrent, to the disk device 120 increases, a processing time per each access is longer by a certain value or more than a processing time for independently executed access, and a delay of a response by the file system occurs. Thus, access to the disk device 120 is biased toward a user who causes a high load, and disk access by a user who causes a low load may be inhibited. In the first embodiment, the data size of the request is divided into the certain sizes, requests are issued, and a time period for each access to the disk device 120 may be a certain time period (of, for example, 10 milliseconds). Thus, the number of times of access executed in concurrent for each of the certain time periods may be accurately calculated. A time for a response to access may be controlled to be equal to or shorter than N times of a time period for a response to independently executed access by limiting the number of times of concurrently executable access based on the number of times of access executed in concurrent for each of the certain time periods. In addition, requests to execute access that are provided by users may be fairly processed while time periods for responses to the access are equal to or shorter than N times of the time for the response to the independently executed access. In the first embodiment, since the numbers of times of access, executed in concurrent, to the disk device 120 are limited, delays of responses to requests may be suppressed and the numbers of the times of the access executed in concurrent may be controlled so as to avoid the fact that only the numbers of times of access executed in concurrent based on requests from users who cause a high load increase. In the calculation example of the aforementioned Equations (1), an elapsed time period in which the number of times of access executed in concurrent is 1 is the elapsed time period for the file access 3 and is 30 milliseconds. If N=1.5, 1.5 times of the elapsed time period in which the number of times of access executed in concurrent is 1 is 30 milliseconds×1.5=45 milliseconds. The disk load state analyzer 104 selects the maximum value among the averages of the numbers of times of access executed in concurrent for the file access executed for time periods of 45 milliseconds or less in the calculation example of the aforementioned Equations (1). As a result, in the calculation example of the aforementioned Equations (1), the average of the numbers of the times of the access executed in concurrent for the file access 4 executed for the elapsed time period of 40 milliseconds is selected and is 3.25. As described above, the thread assignment controller 102 controls the number of concurrently executed server threads 106 and thereby controls access to the disk device 120. The disk load state analyzer 104 determines, as the number of times of concurrently executable access, an integer "3" of 3.25 that is the selected average of the numbers of the times of the access executed in concurrent and notifies the thread assignment controller 102 of the integer "3".

The thread assignment controller 102 limits the number of concurrently executed server threads 106 so as to ensure that the limited number does not exceed the notified number "3" that is the number of times of concurrently executable access.

After that, the number of times of concurrently executable access is changed to 3, and details included in the access time record table 105 stored on the memory and corresponding to the calculation results of the aforementioned Equations (1) are cleared. Then, when the total of the numbers of times of file access becomes equal to a certain value, the number of times of concurrently executable access is recalculated in the aforementioned manner, and it is determined whether the recalculated number of times of concurrently executable access is valid.

In the configuration of the distributed file system illustrated in FIG. 1, the thread assignment controller 102 may count the number of concurrently executed server threads 106 for each of the users and the number of concurrently executed server threads 106 for all the users. In this case, the thread assignment controller 102 may process requests while the number, counted for all the users, of concurrently executed threads does not exceed the number, notified by the disk load state analyzer 104, of times of concurrently executable access. When requests that cause the number, calculated for all the users, of times of concurrently executed threads to exceed the number of times of concurrently executable access are provided, the thread assignment controller 102 may execute the following control operation. That is, the thread assignment controller 102 reduces, based on the minimum number, counted for a user, of times of concurrently executed threads among the numbers, counted for the users, of times of concurrently executed threads, the numbers of times of concurrently executed server threads 106 based on requests from the other users.

Figure 3:
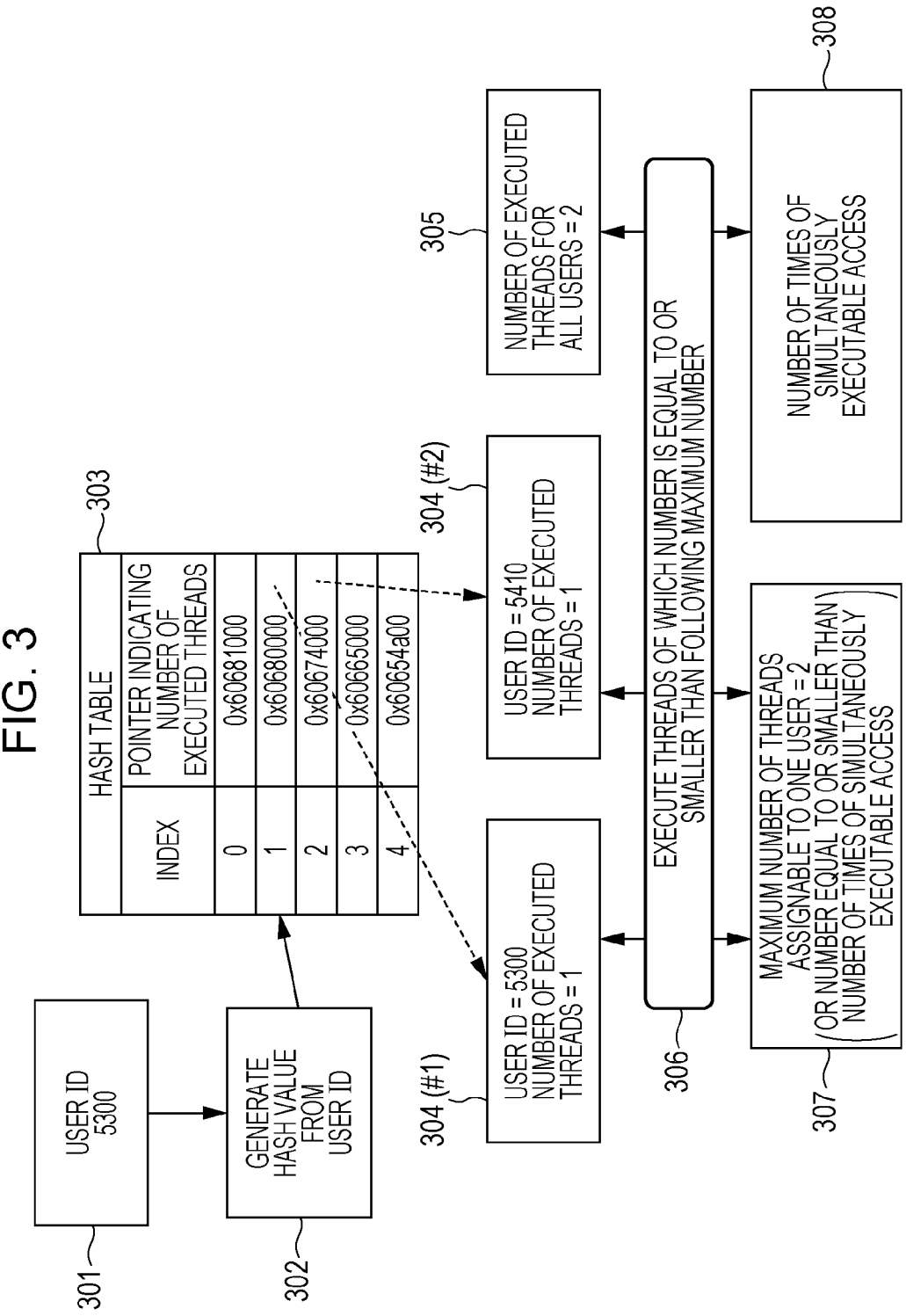
FIG. 3 is a diagram describing operations of controlling the number of executed threads for all users and the number of executed threads for each of the users.

FIG. 3 is a diagram describing operations of controlling the number (number of concurrently executed threads) of executed threads for all the users and the numbers (number of concurrently executed threads) of executed threads for each of the users.

The thread assignment controller 102 activates a server thread 106 for each of requests issued by the request receiver 101 at time intervals of, for example, 10 milliseconds, based on a request from the request transmitter 111 included in the client machine 110 (illustrated in FIG. 1) operated by the user. The thread assignment controller 102 limits the number of concurrently executed server threads 106 for each of the users and the number of concurrently executed server threads 106 for all the users.

More specifically, the thread assignment controller 102 executes the following control operation when activating a server thread 106 based on a request newly input to the thread assignment controller 102 from the request receiver 101.

First, the thread assignment controller 102 executes a process 302 of generating a hash value for a user ID 301 added to the aforementioned input request. For example, a hash value "1" is generated from a value "5300" of the user ID 301.

The thread assignment controller 102 searches, on a hash table 303 stored in the memory of the server machine 100, a record having the generated hash value in an INDEX item.

If the interested record does not exist on the hash table 303, the thread assignment controller 102 executes the following process. First, the thread assignment controller 102 generates a new record on the hash table 303 and registers the aforementioned hash value in an INDEX item of the generated record. In addition, the thread assignment controller 102 secures a storage region 304 (304(#1), 304(#2), or the like) for storing the number (number of concurrently executed threads) of executed threads corresponding to the user ID from which the hash value has been generated.

Note that an initial value of the storage region 304 is set to 0. Then, the thread assignment controller 102 registers a pointer value indicating an address of the secured storage region 304 in a pointer item of the record newly generated on the hash table 303. Then, the thread assignment controller 102 acquires the pointer value. For example, a storage region 304(#1) is secured for the hash value "1", while the hash value "1" and the pointer value "0x60680000" are registered in the new record on the hash table 303. Alternatively, for example, a storage region 304(#2) is secured for a hash value "2", while the hash value "2" and a pointer value "0x60674000" are registered in a new record on the hash table 303. The same applies to other records on the hash table 303.

When finding the record having the aforementioned hash value in the INDEX item on the hash table 303, the thread assignment controller 102 acquires the pointer value registered in the record.

The thread assignment controller 102 increments, by 1, the number, stored in the storage region 304 on the memory at the address indicated by the pointer value acquired from the hash table 303 and corresponding to the user ID from which the hash value has been generated, of executed threads. Concurrently, the thread assignment controller 102 increments, by 1, the number, corresponding to all the users and stored in a storage region 305 on the memory of the server machine 100, of executed threads.

The thread assignment controller 102 executes the following control operation every time access to the disk device 120 by a server thread 106 is completed.

First, the thread assignment controller 102 executes the process 302 of generating the hash value for the user ID 301 corresponding to the server thread 106 that has completed the access.

The thread assignment controller 102 searches the record having the generated hash value in the INDEX item on the hash table 303 stored on the memory of the server machine 100 and acquires the pointer value registered in the record.

Since the access has been completed, the thread assignment controller 102 reduces, by 1, the number, stored in the storage region 304 at the address indicated by the pointer value acquired from the hash table 303 on the memory and corresponding to the user ID from which the hash value has been generated, of executed threads. Concurrently, the thread assignment controller 102 reduces, by 1, the number, stored in the storage region 305 and corresponding to all the users, of executed threads.

The thread assignment controller 102 executes the following control process before managing the increase and reduction in the number of executed threads.

The thread assignment controller 102 controls the numbers, stored in storage regions 304, of executed threads for user IDs #1, #2, . . . and thereby inhibits the numbers of the executed threads for the users IDs from exceeding the maximum number, stored in a storage region 307 on the memory of the server machine 100, of threads assignable to one user (306 in FIG. 3).

Specifically, when receiving a request from the request receiver 101, the thread assignment controller 102 references, through the hash table 303, the number, stored in a storage region 304 corresponding to a user ID added to the request, of executed threads.

If the number, stored in the aforementioned storage region 304, of the executed threads exceeds the maximum number, stored in the storage region 307, of threads assignable to one user, the thread assignment controller 102 does not activate a server thread 106 based on the received request. In this case, the request receiver 101 keeps the request waiting in the request queue secured on the memory of the server machine 100. This control operation may inhibit a user who processes a large amount of data from taking a resource away from a user who processes a small amount of data. Thus, the control operation may achieve access that is fair between users.

On the other hand, if the number, stored in the aforementioned storage region 304, of the executed threads does not exceed the maximum number, stored in the storage region 307, of threads assignable to one user, the thread assignment controller 102 executes the following control.

The thread assignment controller 102 controls the assignment of threads so as to ensure that the number, stored in the storage region 305, of executed threads for all the users does not exceeds the number, stored in a storage region 308 on the memory of the server machine 100, of times of concurrently executable access (306 in FIG. 3).

When receiving a request from the request receiver 101, the thread assignment controller 102 activates a server thread 106 based on the received request if the number, stored in the storage region 305, of executed threads for all the users does not exceed the number, stored in the storage region 308, of times of concurrently executable access.

If the number of the executed threads for all the users exceeds the number of times of concurrently executable access, the thread assignment controller 102 executes the following control operation.

The thread assignment controller 102 references the hash table 303, acquires the minimum number of executed threads among the numbers, stored in the storage regions 304 for the users, of executed threads, and resets the acquired number as the maximum number, stored in the storage region 307, of threads assignable to one user.

As a result, regarding a user ID for which the number of executed threads is large, the issuance of a request to a server thread 106 is suppressed so as to ensure that the number of the executed threads is equal to or smaller than the aforementioned reset maximum number of threads assignable to one user. Specifically, based on a user for which a counted number of executed threads is smallest among the numbers (numbers of times of concurrently executed threads), counted for the users, of executed threads, the numbers of server threads 106 executed based on requests from the other users are reduced.

In this manner, the number (number of concurrently executed threads) of executed threads may be controlled so as to ensure that a request provided by a user who accesses a large amount of data to be input and output does not significantly delay a request provided by a user who accesses a small amount of data to be input and output. As a result, access fairness between users may be secured.

Next, a detailed control operation of the distributed file system with the configuration illustrated in FIG. 1 according to the first embodiment is described.

First, a detailed operation of the request transmitter 111 included in the client machine 110 is described below.

Figure 4:
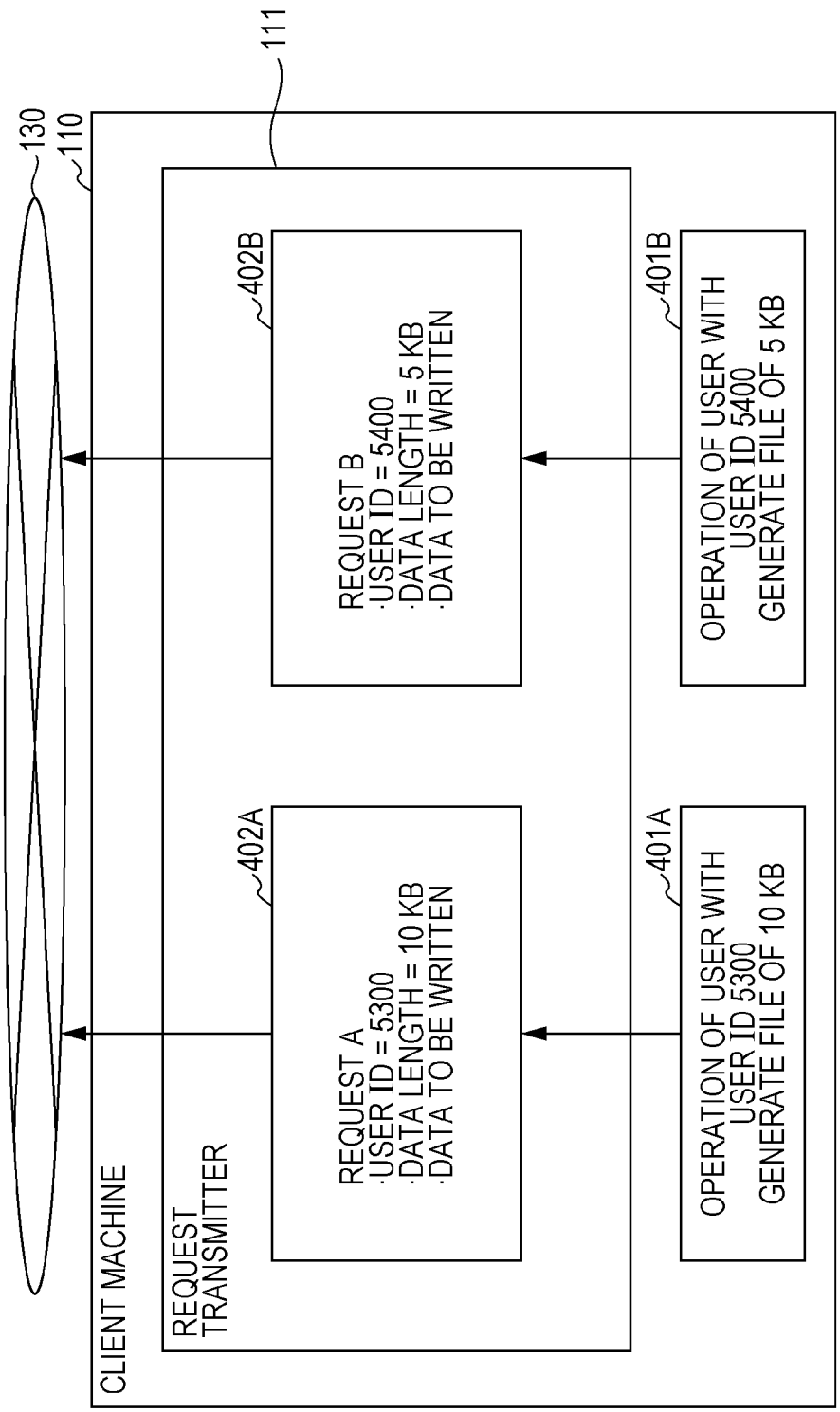
FIG. 4 is an explanatory diagram illustrating a request transmitter.

FIG. 4 is a diagram describing the request transmitter 111 included in the client machine 110 illustrated in FIG. 1.

When users perform access 401A, 401B, and the like to the distributed file system, the request transmitter 111 generates requests 402A, 402B, and the like and transmits the requests 402A, 402B, and the like to the server machine 100 illustrated in FIG. 1.

The request transmitter 111 adds, to the requests 402A, 402B, and the like, information (user IDs) identifying the users who perform the access 401A, 401B, and the like.

Thus, the request receiver 101 of the server machine 100 may identify the users based on the requests.

As described above with reference to FIG. 3, the thread assignment controller 102 may control, based on the user IDs, the number (number of concurrently executed threads) of executed threads for each of the users and the number (number of concurrently executed threads) of executed threads for all the users upon the activation of a server thread 106.

FIG. 5 is a diagram illustrating a specific example of data formats of the requests 402A, 402B, and the like illustrated in FIG. 4. A value that indicates a request type such as write (indicating a write request) or read (indicating a read request) is stored at a position corresponding to a data offset 0 of the request, for example. A user ID such as "5300" is stored at a position corresponding to a data offset 8 of the request, for example. A size that indicates the length of data to be written is stored at a position corresponding to a data offset 16 of the request. If the request type indicates write, the data to be written in the disk device 120 (refer to FIG. 1) is stored at a position corresponding to a data offset 24 of the request.

Next, detailed operations of the request receiver 101 included in the server machine 100 are described.

Data sizes (for example, the sizes of data requested to be written) of requests transmitted from the client machine 110 may be different. Thus, if writing of data in the disk device 120 is executed, processing times may vary and the load state of the disk device 120 may not be accurately calculated. Even if the data sizes of the requests transmitted from the client machine 110 are different, the request receiver 101 divides a data size of each of the requests received from the client machine 110 into certain sizes causing each of time periods for access to be a certain time period or less. The divided data sizes may be equal to the block size (a multiple of 4 KB (kilobytes) in general) of the file system of the disk device 120, for example.

Figure 6:
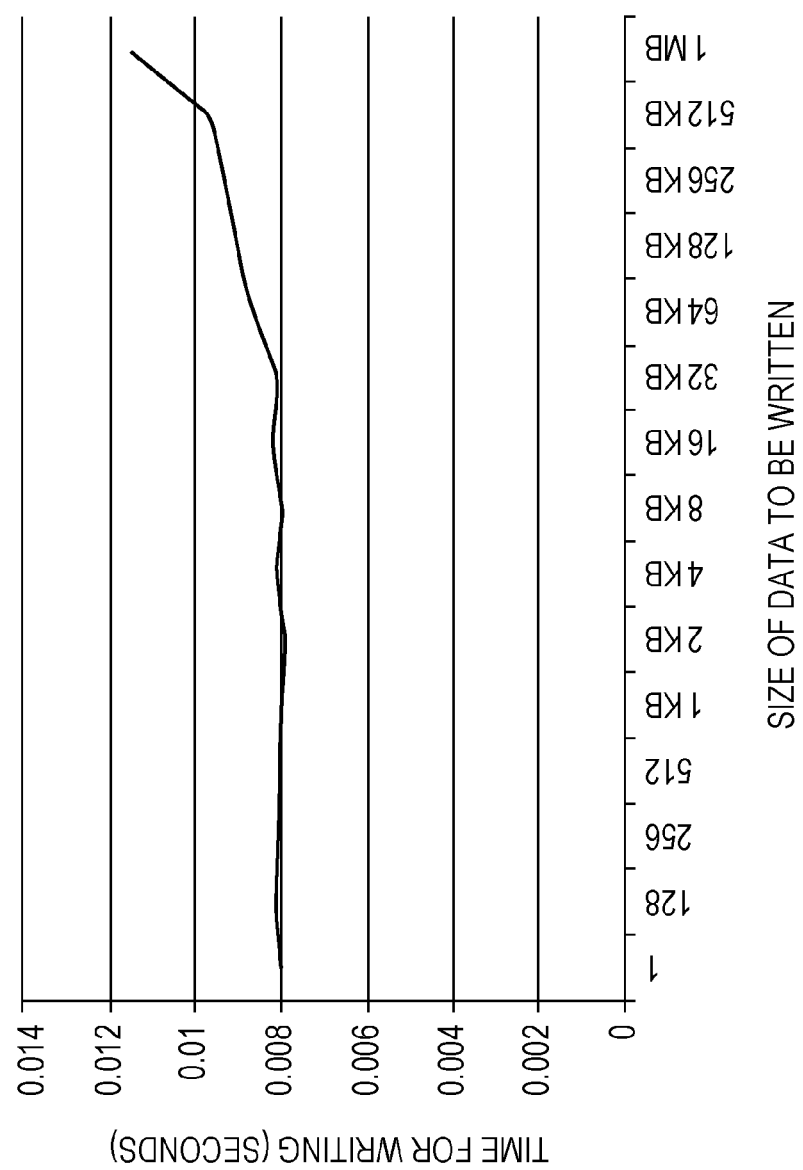
FIG. 6 is a diagram illustrating an example of a graph of time periods for writing data with respect to the sizes of the data to be written if a third extended (EXT3) file system (a block size=4 KB) is provided.

It is apparent from measured values that times for processing executed for the access to the disk device 120 are not significantly different when the divided data sizes are equal to or smaller than the block size. FIG. 6 is a diagram illustrating an example of a graph of time periods (of seconds) for writing data with respect to the sizes of the data to be written if the disk device 120 has a third extended (EXT3) file system (block size=4 KB).

As is understood from the example of the graph, the times for writing the data having the sizes equal to or smaller than the block size (of 4 KB) in the disk device 120 are not significantly different. Thus, the request receiver 101 divides a data size of a request from the client machine 110 into the same sizes as the block size and causes data items each having the same size as the block size to be written in the disk device 120 without writing the data with the size (refer to FIG. 4) specified by a user. Thus, time periods for processing executed upon disk access may be a fixed time period, and the load state of the disk device 120 may be accurately calculated.

Figure 7:
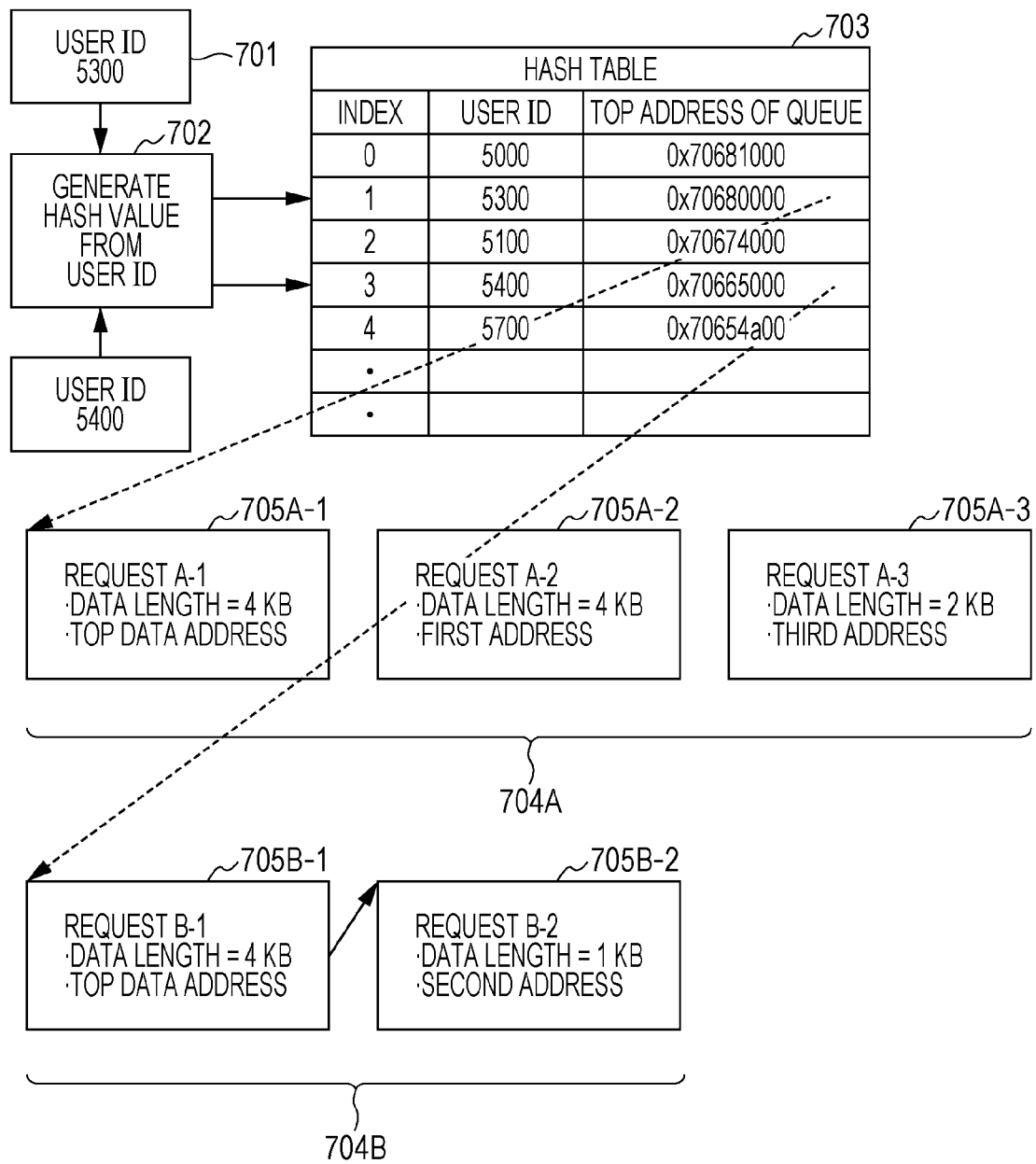
FIG. 7 is a diagram describing request management by a request receiver.

In order to divide a data size of a request from the client machine 110 into the same sizes as the block size and process data, the request receiver 101 manages requests using a data structure illustrated in FIG. 7.

Referring to FIG. 7, every time the request receiver 101 receives a request from the request transmitter 111 included in the client machine 110 operated by the user, the request receiver 101 executes the following control operation. The request receiver 101 divides a data size of the received request into certain sizes equal to, for example, the block size of 4 KB and causes data items each having the certain size to be stored (queued) in a request queue 305 (305A, 305B, or the like) secured as a storage region for the user on the memory included in the server machine 100.

More specifically, the request receiver 101 executes a process 702 of generating a hash value for a user ID 701 added to the received request. For example, the hash value "1" is generated for the user ID "5300" (refer to 402A of FIG. 4) added to the received request A.

The request receiver 101 searches a record having the generated hash value in an INDEX item on a hash table 703 (different from the hash table 303 illustrated in FIG. 3) stored on the memory of the server machine 100.

If the interested record does not exist on the hash table 703, the request receiver 101 executes the following process. First, the request receiver 101 generates a new record on the hash table 703 and registers the hash value in an INDEX item of the new record. In addition, the request receiver 101 secures a request queue 704 (704A, 704B, or the like) for storing requests representing, for example, the same data sizes as the block size and obtained by dividing the request corresponding to the user ID from which the hash value has been generated. Then, the request receiver 101 registers a top address of the generated request queue 704 in an address item of the record newly generated on the hash table 703. Then, the request receiver 101 acquires the top address. For example, a request queue 704A is secured for the hash value "1" generated from the user ID "5300" indicated by the request 402A illustrated in FIG. 4. Then, the hash value "1" and the top address "0x70680000" of the request queue 704A are registered in the new record on the hash table 703. Alternatively, for example, a request queue 704B is secured for a hash value "3" generated from a user ID "5400" indicated by a request queue 704B illustrated in FIG. 4. Then, the hash value "3" and a top address "0x70665000" of the request queue 704B are registered in a new record on the hash table 703.

When finding the record having the hash value in the INDEX item on the hash table 703, the request receiver 101 acquires the top address registered in the found record.

The request receiver 101 generates one or more requests obtained by dividing the data size of the received request into the certain sizes such as the same sizes as the block size of 4 KB and registers the generated requests at the end of the request queue 704 indicated by the top address acquired from the hash table 703 on the memory. For example, requests 705A-1 (having a data length of 4 KB), 705A-2 (having a data length of 4 KB), and 705A-3 (having a data length of 2 KB) are generated by dividing the data (illustrated in FIG. 4) having a data length of 10 KB and to be written. Then, the requests 705A-1, 705A-2, and 705A-3 are associated with the user ID added to the request 402A and sequentially registered in the request queue 704A to be accessed through the hash table 703. Alternatively, for example, requests 705B-1 (having a data length of 4 KB) and 705B-2 (having a data length of 1 KB) are generated by dividing the data (illustrated in FIG. 4) having a data length of 5 KB and to be written. Then, the requests 705B-1 and 705B-2 are associated with the user ID added to the request 402B and sequentially registered in the request queue 704B to be accessed through the hash table 703.

The data size (data length) of the last request 705A-3 registered in the request queue 704A and the data size (data length) of the last request 705B-2 registered in the request queue 704B are not equal to the block size of 4 KB and are fractions. As described above with reference to FIG. 6, however, time periods for processing of the requests are each a certain time period that is nearly equal to a period of time for processing of a request having a data size of 4 KB. In the first embodiment, time periods for disk access executed based on requests are equal to the certain time period, and thus the load state of the disk device 120 may be accurately calculated.

As described above, since the request queues 704 (704A, 704B, and the like) are managed by the request receiver 101, the thread assignment controller 102 may access the disk device 120 on a user basis and a block size basis as described later.

Next, detailed operations of the thread assignment controller 102 included in the server machine 100 are described.

Figure 8:
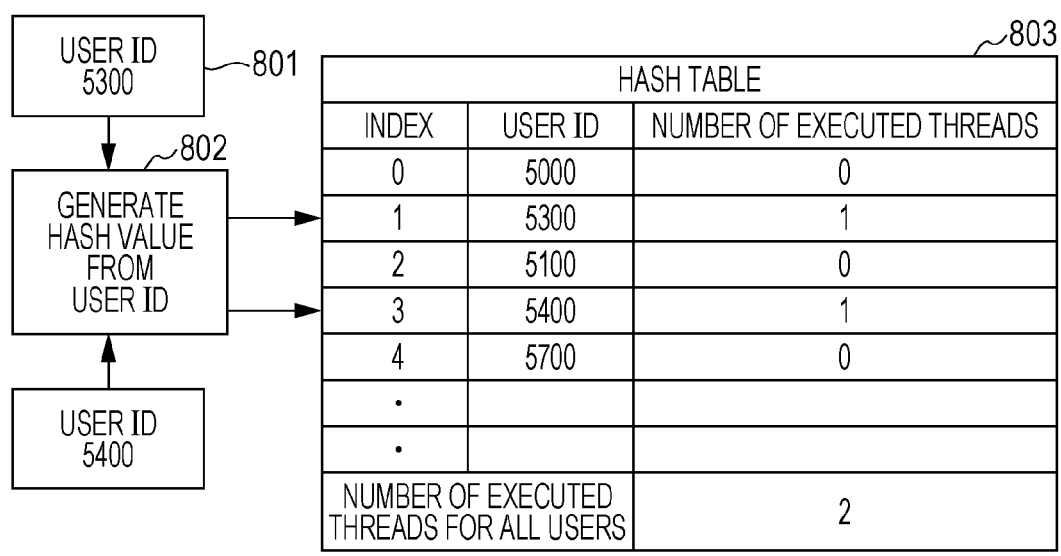
FIG. 8 is a diagram illustrating an example of a data configuration of a hash table.

FIG. 8 is a diagram illustrating an example of a data configuration of a hash table 803 stored on the memory of the server machine 100 by the thread assignment controller 102. The hash table 803 has the same function as the hash table 303 described with reference to FIG. 3. However, the storage regions 304 described with reference to FIG. 3 and storing the numbers of threads executed for the user IDs are directly stored as one item in the hash table 803 and the pointer value item is omitted in FIG. 8. In addition, the storage region 305 described with reference to FIG. 3 and storing the number of threads executed for all the users is stored at the end of the hash table 803 as illustrated in FIG. 8. In addition, an INDEX item for storing hash values, and the user IDs from which the hash values are generated, are stored in records included in the hash table 803.

The thread assignment controller 102 assigns server threads 106 (FIG. 1) to requests received from the request receiver 101 for the user IDs and representing, for example, the same data sizes as the block size of 4 KB on a user basis using a round-robin method. The thread assignment controller 102 manages the number (number of assigned threads) of executed threads on the hash table 803 for each user and controls the numbers of executed threads so as to inhibit the numbers of the executed threads from exceeding the number of times of concurrently executable access to the disk device 120 due to the assignment of a server thread 106.

Figure 9:
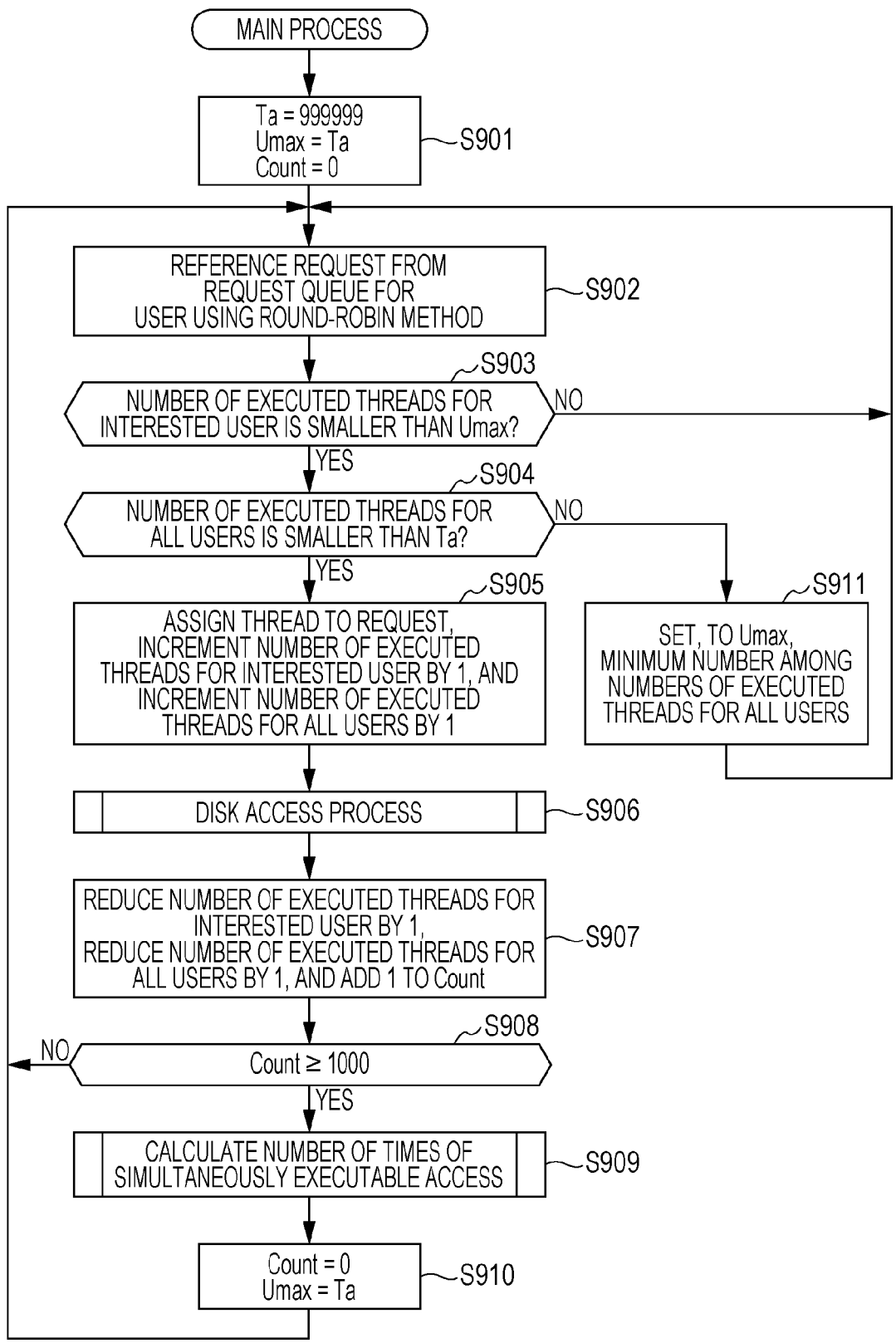
FIG. 9 is a flowchart of a detailed example of a process of controlling the assignment of threads.

FIG. 9 is a flowchart of an example of a process of controlling the assignment of threads. At least one central processing unit (CPU) of the server machine 100 reads, into the memory, a thread assignment control program stored in an external storage device or the like and executes the process of controlling the assignment of threads. In the process of controlling the assignment of threads, the CPU of the server machine 100 executes a function of the thread assignment controller 102. In addition, the process is executed as a main process of the distributed file system on the server machine 100. The single CPU may include multiple cores.

First, a variable Ta on the memory is initialized to 999999, a variable Umax is initialized to a value Ta, and a variable Count is initialized to 0 (in step S901). The variable Ta corresponds to the storage region 308 illustrated in FIG. 3 and holds the number of times of concurrently executable access. The variable Umax corresponds to the storage region 307 illustrated in FIG. 3 and holds the maximum number of threads assignable to one user. The variable Count is a variable that controls a time interval at which a process of calculating the number of times of concurrently executable access in step S909 (described later) is executed. The process of calculating the number of times of concurrently executable access is a function of the disk load state analyzer 104 illustrated in FIG. 1. After the value of the variable Count is initialized and set to 0 in step S901, the value of the variable Count is incremented by 1 in step S907 every time access executed based on a single request is completed. Then, if it is determined that the value of the variable Count reaches 1000 in step S908, the process of calculating the number of times of concurrently executable access is executed in step S909. After that, the value of the variable Count is reset to 0 in step S910. Then, the same process is repeated.

Next, a top request registered in any of the request queues 704 (704A, 704B, . . . ) generated on the memory by the request receiver 101 and provided for the users is referenced using the round-robin method or the like, for example (in step S902).

Next, the hash table 803 generated on the memory is referenced, and the number of executed threads for a user ID corresponding to the request queue 704 referenced in step S902 is acquired (in step S903). Then, it is determined whether or not the number of executed threads is smaller than the maximum number, held by the variable Umax, of threads assignable to one user (in step S903).

If the answer to the determination of step S903 is YES, it is determined whether or not the number, stored in the storage region at the end of the hash table 803, of executed threads for all the users is smaller than the number, held by the variable Ta, of times of concurrently executable access (in step S904).

If the answer to the determination of step S904 is YES, a server thread 106 (FIG. 1) is assigned to the request referenced in step S902 and corresponding to the user ID (in step S905). After that, the number, corresponding to the user ID on the hash table 803, of executed threads is incremented by 1 (in step S905). Concurrently, the number, stored at the end of the hash table 803, of executed threads for all the users is incremented by 1 (in step S905).

After that, a disk access process is executed by the server thread 106 assigned to the request referenced in step S902 in step S905 and corresponding to the user ID (in step S906). In the disk access process, a function of the disk access time recorder 103 illustrated in FIG. 1 is executed. Details of the disk access process are described with reference to FIGS. 9 to 11.

When the disk access process executed on the aforementioned request is completed, the number of executed threads that is registered in the record corresponding to the user ID indicated on the hash table 803 and subjected to the disk access process is reduced by 1 (in step S907). Concurrently, the number of executed threads for all the users that is stored at the end of the hash table 803 is reduced by 1 (in step S907). In addition, the variable Count is incremented by 1 (in step S907).

After that, it is determined whether or not the value of the variable Count reaches 1000 (in step S908).

If the answer to the determination of step S908 is NO, the process returns to step S902 and is executed on the next request.

While the process is repeatedly executed on each request, the value of the variable Count is incremented in step S907. When the value of the variable Count reaches 1000, the answer to the determination of step S908 is YES.

As a result, the process of calculating the number of times of concurrently executable access is executed (in step S909). In this process, the function of the disk load state analyzer 104 illustrated in FIG. 1 is executed. Details of the process are described with reference to FIG. 12 and FIGS. 13A to 13C. As a result of the process, the number, held by the variable Ta, of times of concurrently executable access is updated. The value of the variable Ta is set to a large value in step S901 immediately after the activation of the system and the variable Ta becomes in a state in which server threads 106 are assignable to requests without being limited. However, when a time elapses and the number of times of access executed in concurrent increases, the process of calculating the number of times of concurrently executable access in step S909 limits the number, held by the variable Ta, of times of concurrently executable access to an appropriate value based on the current load state of the disk device 120 or to "3" or the like.

When the number of times of concurrently executable access is calculated, the value of the variable Count is reset to 0, and the number, newly held by the variable Ta in step S909, of times of concurrently executable access is set as the maximum number, held by the variable Umax, of threads assignable to one user. Specifically, immediately after the number of times of concurrently executable access is updated, server threads 106 of which the number is equal to or smaller than the number of times of concurrently executable access may be assigned fairly for the users.

After that, the process returns to step S902 and is executed on the next request.

In the aforementioned process, when the number of executed threads for the user ID corresponding to the request queue referenced in step S902 reaches the maximum number, held by the variable Umax, of threads assignable to one user or the answer to the determination of step S903 is NO, a server thread 106 is not activated. In this case, the aforementioned request is kept waiting in the request queue 704. After that, the process returns to step S902 and is executed on a request corresponding to the next user ID. The operation of limiting the number of executed threads for each user based on the variable Umax may inhibit a user who processes a large amount of data from taking a resource away from a user who processes a small amount of data. Thus, access that is fair between the users is achieved even if the number of executed threads for all the users does not exceed a predetermined number (for example, Ta).

In the aforementioned process, when the number of executed threads for all the users reaches the number, held by the variable Ta, of times of concurrently executable access or the answer to the determination of step S904 is NO, the following control operation is executed. The hash value 803 is referenced, the minimum number of executed threads among the numbers of executed threads for the user IDs is acquired, and the acquired number is reset as the maximum, held by the variable Umax, of threads assignable to one user (in step S911). As a result, in step S903, regarding a user ID for which the number of executed threads is large, the activation of a server thread 106 based on a request is suppressed so as to ensure that the number of the executed threads is smaller than the reset value of the variable Umax. Specifically, based on a user for which the number of executed threads is smallest among the numbers, calculated for the users, of executed threads, the number of server threads 106 executed based on a request from another user is reduced. The process of step S911 increases a possibility that a request from a user who accesses a relatively small amount of data to be input and output is processed. Thus, access that is fair between users is achieved by the process of step S911 even if the number of executed threads for all the users exceeds the predetermined number (for example, Ta).

In this manner, the number (number of times of concurrently executed threads) of executed threads may be controlled by the control operation exemplified in FIG. 3 so as to ensure that a delay, caused by a request provided by a user who accesses a large amount of data to be input and output, of a request provided by a user who accesses a relatively small amount of data to be input and output is avoided. As a result, access that is fair between users may be secured.

In step S911, the value of the variable Umax may not be set to a value corresponding to a user ID for which the number of executed threads is smallest. In step S911, the value of the variable Umax may be controlled and set to a value smaller than the current value of the variable Umax.

Next, detailed operations of the disk access time recorder 103 illustrated in FIG. 1 are described.

As described above, the disk access time recorder 103 records, in an aggregation table 1 exemplified in FIG. 10, start times (disk access start times 1001) of access to the disk devices 120 and end times (disk access end times 1002) of the access to the disk devices 120, for example. Then, the disk access time recorder 103 calculates, from the recorded start and end times of the access, elapsed time periods 1003 and the numbers 1004 of times of access executed in concurrent and stores the calculated elapsed time periods 1003 and the calculated numbers 1004 in the aggregation table 1.

Figure 11:
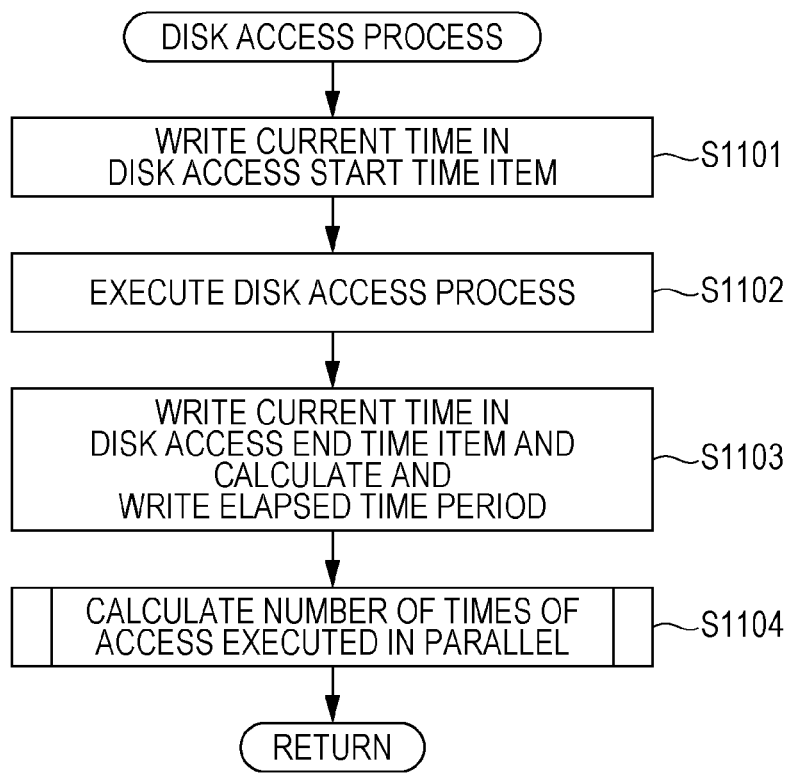
FIG. 11 is a flowchart of a detailed example of a disk access process.

FIG. 11 is a flowchart of a detailed example of the disk access process of step S906 illustrated in FIG. 9. In the disk access process, a function of the disk access time recorder 103 is executed and controls the aggregation table 1 having an exemplary data configuration illustrated in FIG. 10.

When step S906 illustrated in FIG. 9 is called, a new record is generated in the aggregation table 1. Then, a current time is written in an item included in the new record and representing a disk access start time 1001 (in step S1101).

Next, the disk access process is executed by the server thread 106 assigned in step S905 illustrated in FIG. 9 (in step S1102).

When the disk access process of step S1102 is completed, a current time is written in an item representing a disk access end time 1002 and included in the new record generated in the aggregation table 1 in step S1101 (in step S1103). In addition, a value of the item included in the record and representing the disk access start time 1001 is subtracted from a value of the item included in the record and representing the disk access end time 1002, and the result of the subtraction is written in an item included in the same record and representing an elapsed time period 1003 (in step S1103).

After that, a process of calculating the number of times of access executed in concurrent is executed (in step S1104). An example of this calculation process is illustrated as a flowchart in FIG. 12.

Figure 12:
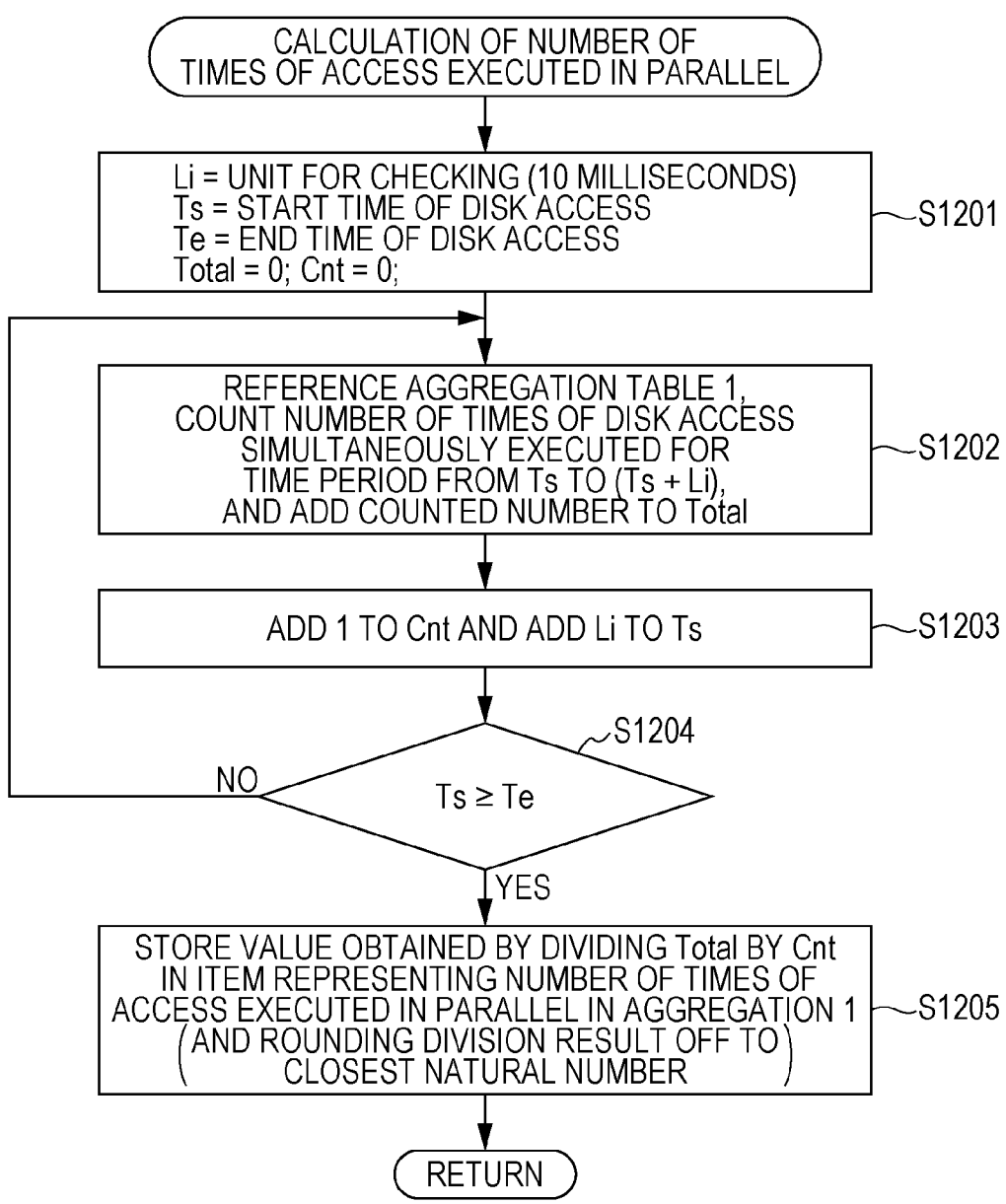
FIG. 12 is a flowchart of a detailed example of a process of calculating the number of times of disk access executed in parallel.

Referring to FIG. 12, first, a time value of 10 milliseconds is set to a variable Li stored on the memory of the server machine 100 as a unit for checking (in step S1201). In addition, the value, set in step S1101 illustrated in FIG. 11, of the item included in the record on the aggregation table 1 and representing the disk access start time 1001 is initially set to the variable Ts stored on the memory (in step S1201). Similarly, the value, set in step S1103 illustrated in FIG. 11, of the item included in the record on the aggregation table 1 and representing the disk access end time 1002 is initially set to the variable Te stored on the memory (in step S1201). In addition, an initial value of 0 is set to a variable Total stored on the memory and representing the total of the numbers of times of access executed in concurrent (in step S1201). Furthermore, an initial value of 0 is set to a variable Cnt stored on the memory and provided to count the number of time intervals of, for example, 10 milliseconds (in step S1201).

Next, processes of steps S1202 and S1203 are executed at each of the time intervals of, for example, 10 milliseconds.

First, time periods from disk access start times 1001 to disk access end times 1002 in records of the aggregation table 1 having the exemplary data configuration illustrated in FIG. 10 are referenced (in step S1202). Then, the number of times of concurrently executed disk access is counted by counting the number of time periods that are among the time periods in the records and each include a time interval of, for example, 10 milliseconds and are from the time value of the variable Ts to a time value calculated by adding the time value of the variable Ts to the time value of the variable Li (in step S1202). Then, the counted number of the times of the concurrently executed disk access is added to the variable Total (in step S1202). In this process, the number of times of access executed in concurrent in a time period of, for example, 10 milliseconds from the time value of the variable Ts to the calculated time value is counted by adding the time value of the variable Ts to the time value of the variable Li.

After that, the variable Cnt is incremented by 1, the time value of the variable Li is added to the time value of the variable Ts, and the new time value of the variable Ts is obtained (in step S1203). The new time value of the variable Ts indicates a start time of the next time period of, for example, 10 milliseconds.

After that, it is determined whether or not the time value of the variable Ts reaches a value of the item storing the disk access end time 1002 indicated by the variable Te (in step S1204).

If the answer to the determination of step S1204 is NO, the process returns to step S1202, and the process of counting the number of times of access executed in concurrent in the next time period of, for example, 10 milliseconds is repeated.

If the answer to the determination of step S1204 is YES, the total, held by the variable Total, of all the numbers of times of access executed in concurrent for the time periods of, for example, 10 milliseconds is divided by the number, held by the variable Cnt, of the time periods of, for example, 10 milliseconds and the result of the division is rounded off to the closest natural number (in step S1205). Then, the result of the calculation is written in an item that is included in the record generated in step S1101 illustrated in FIG. 9 on the aggregation data 1 having the exemplary data configuration illustrated in FIG. 10 and represents the number 1004 of times of access executed in concurrent.

After that, the process depicted in the flowchart of FIG. 12 is terminated and the process of calculating the number of times of access executed in concurrent in step S1104 illustrated in FIG. 11 is terminated. As a result, the disk access process depicted in the flowchart of FIG. 11 is terminated and the disk access process of step S906 illustrated in FIG. 9 is terminated.

In this manner, the function of the disk access time recorder 103 illustrated in FIG. 1 is achieved.

Data aggregated by the aforementioned disk access process into the aggregation table having the exemplary data configuration illustrated in FIG. 10 is obtained by the same calculation as the Equations (1) described with reference to FIG. 2. However, an average of aggregated numbers of times of access executed in concurrent is rounded off to the closest natural number in each record (indicating each access) of the aggregation table 1 in order to simplify the process of calculating the number of times of concurrently executable access using an aggregation table 2 (described later).

Next, detailed operations of the disk load state analyzer 104 illustrated in FIG. 1 are described.

An average of elapsed time periods is calculated from the aggregation table 1 having the exemplary data configuration illustrated in FIG. 10 for each of the numbers of times of access executed in concurrent, and the aggregation table 2 having an exemplary data configuration illustrated in FIG. 13A is generated and stored on the memory of the server machine 100.

The aggregation table 1 illustrated in FIG. 10 has only one record that has an item storing 1 and representing the number 1004 of times of access executed in concurrent. First, 1 is written in an item that represents the number 1301 of times of access executed in concurrent and is included in a record newly generated on the aggregation table 2 illustrated in FIG. 13A. Subsequently, a value of an item representing an elapsed time period 1003 and included in the record having the item storing 1 and representing the number 1004 of times of access executed in concurrent on the aggregation table 1 (illustrated in FIG. 10), or 0.021219, is written in an item representing an elapsed time period 1302 and included in the record having the item that stores 1 and represents the number 1301 of times of access executed in concurrent on the aggregation table 2 illustrated in FIG. 13A.

The aggregation table 1 illustrated in FIG. 10 has top two records that each have an item storing 2 and representing the number 1004 of times of access executed in concurrent. First, 2 is written in an item that represents the number 1301 of times of access executed in concurrent and is included in a record newly generated on the aggregation table 2 illustrated in FIG. 13A. Subsequently, an average of 0.030298 and 0.025819 that are values of items representing the elapsed time periods 1003 and included in the two records having the items representing the numbers 1004 of times of access executed in concurrent on the aggregation table 1 illustrated in FIG. 10 is calculated to be 0.0280585. Then, the average value of 0.0280585 is written in an item representing an average 1302 of elapsed time periods and included in the record that has the item storing 2 and representing the number 1301 of times of access executed in concurrent on the aggregation table 2 (illustrated in FIG. 13A). In addition, a value of 1.32, which is obtained by dividing the average value of 0.0280585 by the value of 0.021219 stored in the item representing the average 1302 of elapsed time periods and included in the record having the item storing 1 and representing the number 1301 of times of access executed in concurrent on the aggregation table 2, is written in an item representing a ratio 1303 of averages of elapsed time periods and included in the record having the item storing 2 and representing the number 1301 of times of access executed in concurrent on the aggregation table 2. The value of 1.32 indicates the ratio of the average 1302 of elapsed time periods in which the number of times of access executed in concurrent is 2 to the average 1302 of elapsed time periods in which the number of times of access executed in concurrent is 1.

In addition, the aggregation table 1 illustrated in FIG. 10 has the last three records that each have an item storing 3 and representing the number 1004 of times of access executed in concurrent. First, 3 is written in an item that represents the number 1301 of times of access executed in concurrent and is included in a record newly generated on the aggregation table 2 illustrated in FIG. 13A. Subsequently, an average of 0.058311, 0.060431, and 0.063521 that are values of items representing the elapsed time periods 1003 and included in the three records having the items representing the numbers 1004 of times of access executed in concurrent on the aggregation table 1 illustrated in FIG. 10 is calculated to be 0.0607543. Then, the average value of 0.0607543 is written in an item representing the average 1302 of elapsed time periods and included in the record having the item that stores 3 and represents the number 1301 of times of access executed in concurrent on the aggregation table 2 illustrated in FIG. 13A. In addition, a value of 2.86, which is obtained by dividing the average value of 0.0607543 by the value of 0.021219 stored in the item representing the average 1302 of elapsed time periods and included in the record having the item storing 1 and representing the number 1301 of times of access executed in concurrent on the aggregation table 2, is written in an item representing a ratio 1303 of averages of elapsed time periods and included in the record having the item storing 3 and representing the number 1301 of times of access executed in concurrent on the aggregation table 2. The value of 2.86 indicates the ratio of the average 1302 of elapsed time periods in which the number of times of access executed in concurrent is 3 to the average 1302 of elapsed time periods in which the number of times of access executed in concurrent is 1.

In order to suppress, to N times such as two times, a reduction in a time for a response when a high load is applied to the disk device 120, the following control may be executed. That is, the number of times of concurrent access to the disk device 120 is controlled and set to a certain number so as to ensure that an elapsed time period in which the concurrent access is executed is equal to or shorter than N times (such as two times) of an elapsed time period in which the number of times of access executed in concurrent is 1. Referring to the item representing ratios 1303 of averages of elapsed time periods on the aggregation table 2 illustrated in FIG. 13, the value of the item representing the ratio 1303 and corresponding to the item storing 2 and representing the number 1301 of times of access executed in concurrent is smaller than 2 times (or is 1.32 times), while the value of the item representing the ratio 1303 and corresponding to the item storing 3 and representing the number 1301 of times of access executed in concurrent is larger than 2 times (or is 2.86 times). Thus, in the example of the aggregation table 2 illustrated in FIG. 13A, the value of the item that represents the number 1302 of times of access executed in concurrent and suppressing a reduction in a response time is 2 and determined to be the number of times of concurrently executable access.

An average 1302 of elapsed time periods may not be obtained for a value of an item representing the number 1301 of times of access executed in concurrent, depending on an access pattern of a user. For example, in the aggregation table 2 illustrated in FIG. 13B, averages 1302 of elapsed time periods that are represented by items corresponding to items storing 2 and 3 and representing the numbers 1301 of times of access executed in concurrent are not obtained and are 0, and values of items representing ratios 1303 of averages of elapsed time periods and corresponding to the items representing the averages 1302 are not calculated. The ratios are calculated based on linear interpolation using a combination of the value of the item storing 1 and representing the number 1301 of times of access executed in concurrent and the value of the item storing 0.021219 and representing the average 1302 of elapsed time periods and a combination of the value of the item storing 4 and representing the number 1301 of times of access executed in concurrent and the value of the item storing 0.0802534 and representing the average of elapsed time periods.

The ratio of the average of the elapsed time periods in which the number of times of access executed in concurrent is 2=(3.78 times−1 time)/3 ×1+1 time=1.92 times The ratio of the average of the elapsed time periods in which the number of times of access executed in concurrent is 3=(3.78 times−1 time)/3 ×2+1 time=2.85 times If a value of an item representing the average 1302 of elapsed time periods and corresponding to an item storing 1 and representing the number 1301 of times of access executed in concurrent does not exist, a standard elapsed time period is not clear. In this case, the number of times of concurrently executable access may be controlled so as not to be changed until data when the number of times of access executed in concurrent is 1 is obtained.

For example, if the number of times of concurrently executable access is changed to 2, disk access is executed after the change in the number of times of concurrently executable access, and the aggregation table 2 is generated, only values of items representing averages 1302 of elapsed time periods and corresponding to items storing 1 and 2 and representing the numbers 1301 of times of access executed in concurrent are obtained as exemplified in FIG. 13C. This is due to the fact that the assignment of server threads 106 is controlled by the thread assignment controller 102 so as to ensure that the number of times of access executed in concurrent does not exceed 2.

In such a case, when the number of times of access executed in parallel is 3 or more, an elapsed time period is not clear. Thus, the linear interpolation is executed, and the elapsed time period in which the number of times of access executed in parallel is 3 or more is compared with the elapsed time period in which the number of times of access executed in parallel is 1. Then, values of items representing averages 1302 of elapsed time periods in which the numbers of times of access executed in parallel exceed the N times such as 2 times are calculated according to the following equations.

The ratio of the average of the elapsed time periods in which the number of times of access executed in parallel is 3=(1.32 times−1 time)/1×2+1 time=1.64 times The ratio of the average of the elapsed time periods in which the number of times of access executed in parallel is 4=(1.32 times−1 time)/1×3+1 time=1.96 times As described above, the amount of an increase in the number of times of concurrently executable access may be determined by the execution of the linear interpolation on the number, exceeding the number of times of concurrently executable access, of times of access executed in parallel when the number of times of concurrently executable access is too small (or excessively reduced or when there is a margin for a process of the disk device 120).

Figure 14:
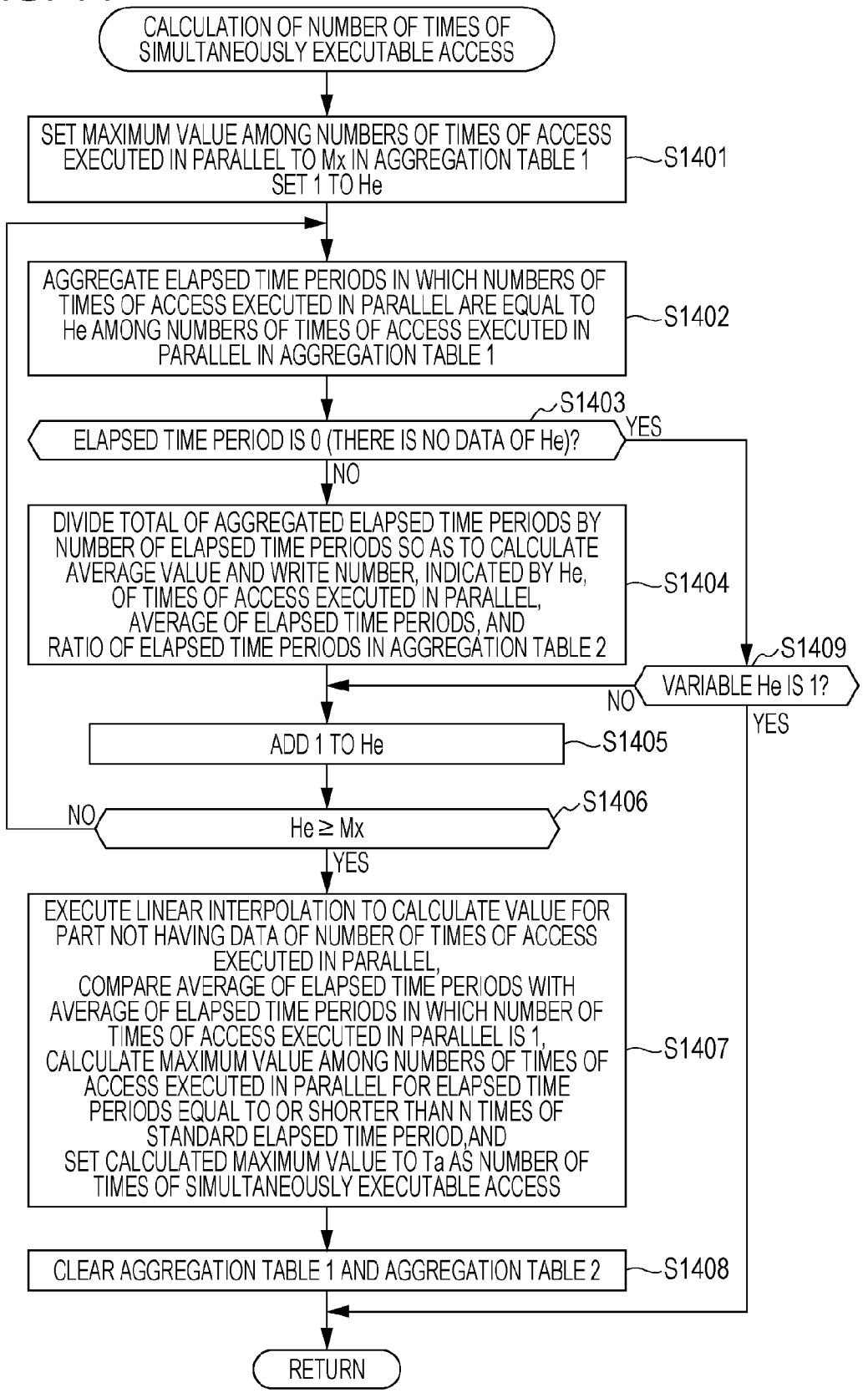
FIG. 14 is a flowchart of a detailed example of a process of calculating the number of times of parallel executable access.

FIG. 14 is a flowchart of a detailed example of the process of calculating the number of times of concurrently executable access in step S909 illustrated in FIG. 9. In this process, a function of the disk load state analyzer 104 is executed and controls the aggregation table 2 having the exemplary data configuration illustrated in FIG. 13A.

First, the maximum value among values of items representing the numbers 1004, aggregated into the aggregation table 1 exemplified in FIG. 10, of times of access executed in parallel is set to a variable Mx stored on the memory of the server machine 100 (in step S1401). In addition, 1 is set to a variable He that indicates a value of an item representing the number 1301 of times of access executed in parallel upon the execution of the aggregation into the aggregation table 2 (in step S1401).

Next, values of items, which represent elapsed time periods 1003 and are included in records having items representing the numbers 1004, equal to the variable He, of times of access executed in parallel among values of items representing the numbers 1004 of times of access executed in parallel on the aggregation table 1 illustrated in FIG. 10, are aggregated (in step S1402). If the variable He is 1, 0.021219 that is the value of the item representing the elapsed time period 1003 and included in the record having the item representing the number 1004 of times of access executed in parallel and storing 1 on the aggregation table 1 illustrated in FIG. 10 is obtained as an aggregated value. If the variable He is 2, 0.030298 and 0.025819 that are the values of the items representing elapsed time periods 1003 and included in the two records having the items representing the numbers 1004 of times of access executed in parallel and storing 2 on the aggregation table 1 illustrated in FIG. 10 are aggregated, and the aggregated value of 0.056117 is obtained. If the variable He is 3, 0.058311, 0.060431, and 0.063521 that are the values of the items representing the elapsed time periods 1003 and included in the three records having the items representing the numbers 1004 of times of access executed in parallel and storing 3 on the aggregation table 1 illustrated in FIG. 10 are aggregated, and the aggregated value of 0.182263 is obtained.

Next, it is determined whether or not the aggregated elapsed time period is 0 (or whether or not data corresponding to the value of the variable He is absent) (in step S1403).

If the total of the aggregated elapsed time periods is not 0 or the answer to the determination of step S1403 is NO, the total of the elapsed time periods aggregated in step S1402 is divided by the number of the items representing the aggregated elapsed time periods and an average of the aggregated elapsed time periods is calculated (in step S1404). If the variable He is 1, the aggregated value of 0.021219 is divided by 1 or the number of the items representing the aggregated elapsed time periods and the average is calculated to be 0.021219. If the variable He is 2, the aggregated value of 0.056117 is divided by 2 or the number of the items representing the aggregated elapsed time periods, and the average of the aggregated elapsed time periods is calculated to be 0.0280585. If the variable He is 3, the aggregated value of 0.182263 is divided by 3 or the number of the items representing the aggregated elapsed time periods and the average of the elapsed time periods is calculated to be 0.0607543. Then, the numbers, indicated by the variable He, of times of access executed in parallel are written as the values of the items representing the numbers 1301 of times of access executed in parallel in the records of the aggregation table 2 exemplified in FIG. 13A, and the aforementioned averages are written as the values of the items representing the averages 1302 of the elapsed time periods in the records of the aggregation table 2 exemplified in FIG. 13A (in step S1404). In addition, values obtained by dividing the values of the items representing the averages 1302 of the elapsed time periods and included in the records by the value of the item representing the average 1302 of the elapsed time periods and corresponding to the record having the item storing 1 and representing the number 1301 of times of access executed in parallel are written as the values of the items included in the records and representing the ratios 1303 of the averages of the elapsed time periods (in step S1404). In the aforementioned calculation example, 1 is written as the number of times of access executed in parallel, 0.021219 is written as the average of the elapsed time periods, and 1 is written as the ratio of the averages of the elapsed time periods in the aggregation table 2. In addition, 2 is written as the number of times of access executed in parallel, 0.0280585 is written as the average of the elapsed time periods, and 1.32 is written as the ratio of the averages of the elapsed time periods in the aggregation table 2. Furthermore, 3 is written as the number of times of access executed in parallel, 0.0607543 is written as the average of the elapsed time periods, and 2.86 is written as the ratio of the averages of the elapsed time periods in the aggregation table 2.

After that, 1 is added to the variable He (in step S1405).

Then, it is determined whether or not the value of the variable He reaches the value of the variable Mx indicating the maximum value among the values of the items included in the aggregation table 1 and representing the numbers 1004 of times of access executed in parallel (in step S1406).

If the answer to the determination of step S1406 is NO, the process returns to step S1402 and the aggregation process is repeatedly executed on the number, represented by the variable He after the addition of 1, of times of access executed in parallel.

In the repeated processes of steps S1402 to S1406, if the total of the elapsed time periods aggregated in step S1402 is 0 or a value, corresponding to the value of the variable He, of an item representing the number 1004 of times of access executed in parallel does not exist on the aggregation table 1, the answer to the determination of step S1403 is YES. In this case, it is determined whether or not the value of the variable He is 1 (in step S1409).

If the value of the variable He is not 1 or the answer to the determination of step S1409 is NO, the aggregation of elapsed time periods in which the number of times of access executed in parallel is equal to the value of the variable He is ignored, the process proceeds to step S1405, and the aggregation process is executed on the number, indicated by the value of the variable He after the addition of 1, of times of access executed in parallel.

If the value of the variable He is 1 or the answer to the determination of step S1409 is YES, a value of an item representing an elapsed time period 1003 and corresponding to 1 that is the number of times of access executed in parallel and is a standard for the calculation of the number of times of concurrently executable access is not obtained from the aggregation table 1. In this case, the process depicted in the flowchart of FIG. 14 is terminated, the process of calculating the number of times of concurrently executable access in step S909 illustrated in FIG. 9 is terminated, data when the number of times of access executed in parallel is 1 is obtained, and thus the number of times of concurrently executable access is controlled so as not to be changed.

If the answer to the determination of step S1406 is YES and the aggregation executed based on the aggregation table 1 and reflected in the aggregation table 2 is terminated, an average 1302 of elapsed time periods is calculated for the number, causing the answer to the determination of step S1403 to be YES, of times of access executed in parallel as described with reference to FIGS. 13B and 13C (in step S1407). After that, the items representing the ratios 1303 of the averages of the elapsed time periods and included in the records of the aggregation table 2 are referenced, and thus the maximum value among values of items representing the numbers 1301 of times of access executed in parallel and included in records indicating that the ratios are equal to or smaller than N times is calculated. Then, the maximum value is set to a variable Ta as the number of times of concurrently executable access (in step S1407).

Lastly, details of the aggregation table 1 exemplified in FIG. 10 and details of the aggregation table 2 exemplified in FIG. 13 are cleared (in step S1408), the process depicted in the flowchart of FIG. 14 is terminated, and the process of calculating the number of times of concurrently executable access in step S909 illustrated in FIG. 9 is terminated.

As described above, if a part of data of the numbers of times of access executed in parallel does not exist, a value is calculated using linear interpolation, and the optimal number of times of concurrently executable access may not be obtained. In addition, an appropriate number of times of concurrently executable access may change depending on an access pattern (random access, sequential access, or the like) of a user and a variation (a temporal reduction caused by a failure of a part of the disks forming the RAID system) in performance of the disks. Thus, the determined number of times of concurrently executable access is periodically checked. A process of checking the number of times of concurrently executable access is executed using the variable Count used in the flowchart of FIG. 9. When the variable Count reaches 1000 in step S908 included in the process depicted in the flowchart of FIG. 9, the process of calculating the number of times of concurrently executable access is executed in step S909. By changing the value of 1000, a frequency at which the number of times of concurrently executable access is checked is adjusted.

The thread assignment controller 102 described with reference to FIG. 8 may execute control so as to assign a large number of threads to a prioritized user on a priority basis without fairly treating all the users. By executing the control, a system administrator (root user or the like) may be prioritized over general users.

Specifically, in a process of suppressing an upper limit on the number of executed threads for each of the users, the control is executed so as to ensure that an upper limit on the number of executed threads for the prioritized user is not suppressed. However, if the number of times of access to be executed in parallel exceeds the number of times of concurrently executable access for all the users, the control may be executed so as to suppress the upper limit on the number of executed threads for the prioritized user in order to suppress a delay of a process of the disk device 120 for the prioritized user.

Figure 15:
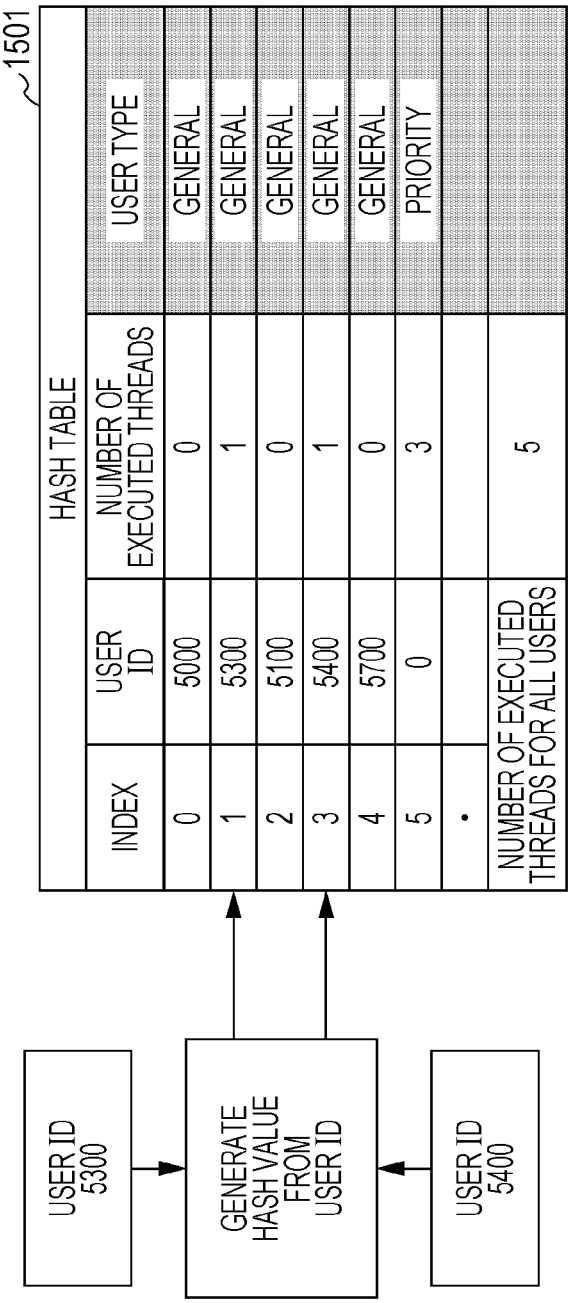
FIG. 15 is a diagram illustrating an example of a data configuration of a hash table according to the second embodiment.

FIG. 15 is a diagram illustrating an example of a data configuration of a hash table 1501 stored on the memory of the server machine 100 by the thread assignment controller 102 illustrated in FIG. 1 as the second embodiment in which an operation of executing the aforementioned control on the prioritized user is achieved. The hash table 1501 is formed by adding a user type item (highlighted in gray) to the aforementioned hash table 803 illustrated in FIG. 8. As values of the user type item, "general" and "priority" are set, for example.

Figure 16:
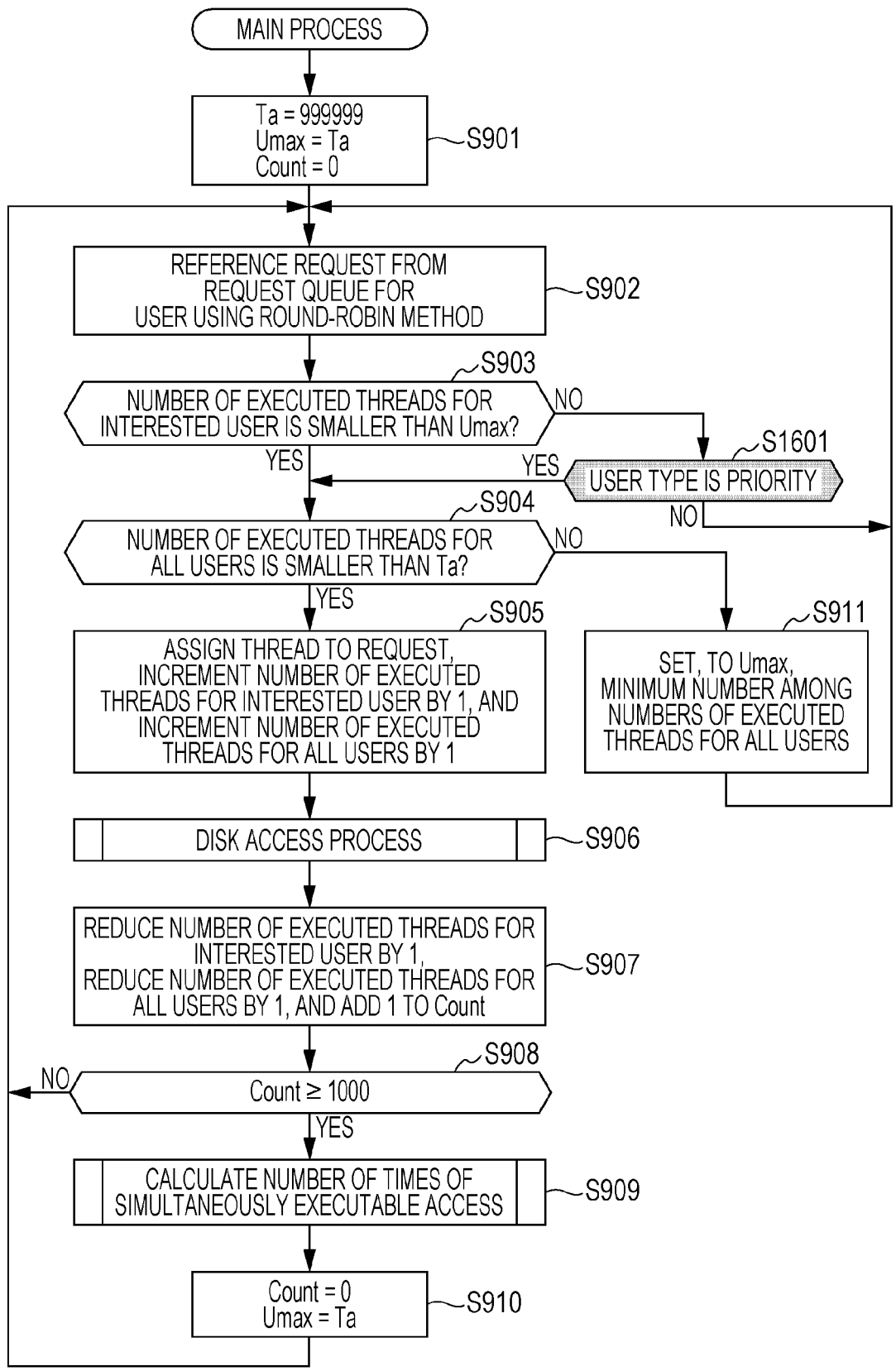
FIG. 16 is a flowchart of a detailed example of a process of controlling the assignment of threads according to the second embodiment.

FIG. 16 is a flowchart of an example of a process of controlling the assignment of the threads according to the second embodiment in which the operation of executing the control on the prioritized user is achieved. In FIG. 16, steps of executing the same processes as the aforementioned flowchart of FIG. 9 are indicated by the same reference numbers as the flowchart of FIG. 9. A difference between the process depicted in the flowchart of FIG. 16 and the process depicted in the flowchart of FIG. 9 is a control process to be executed if the answer to the determination of step S903 is NO.

Referring to FIG. 16, if the number of executed threads for the user ID corresponding to the request queue 703 referenced in step S902 reaches the maximum number, held by the variable Umax, of threads assignable to one user or the answer to the determination of step S903 is NO, step S1601 is executed. In step S1601, a value of a user type item corresponding to the user ID currently processed is referenced on the hash table 803 having the exemplary data configuration illustrated in FIG. 15. Then, it is determined whether or not the value of the user type item indicates "priority" (in step S1601).

If the value of the user type item does not indicate "priority" and indicates "general" (the user ID illustrated in FIG. 15 is not 0, for example) or the answer to the determination of step S1601 is NO, a server thread 106 is not activated in the same manner as the flowchart of FIG. 9.

If the value of the user type item indicates "priority" (the user ID illustrated in FIG. 15 is 0 or indicates a root user or the like) or the answer to the determination of step S1601 is YES, the process returns to step S904 and a server thread 106 may be assigned. However, if the number of executed threads for all the users reaches the number, held by the variable Ta, of times of concurrently executable access or the answer to the determination of step S904 is NO, the same control process as the flowchart of FIG. 9 is executed and the assignment of a server thread 106 to the prioritized user is suppressed.

As described above, in the control operation according to the second embodiment, a failure of a process performed by the prioritized user such as the system administrator may be inhibited by the process of controlling the number of threads executed to access the disk device 120.

The thread assignment controller 102 described with reference to FIG. 8 does not use the round-robin method in order to assign the threads and may control, based on the amounts (hereinafter referred to as IO amounts) of data subjected to file access in the past, the assignment of threads to users while prioritizing a user whose IO amount is small over a user whose ID amount is large. The execution of the control may reduce the probability of the occurrence of a delay, caused by access performed by the user whose IO amount is large, of access performed by the user whose IO amount is small.

Specifically, in the process of suppressing an upper limit on the number of executed threads for each user, the control may be executed without the round-robin method so as to ensure that a thread is assigned to a user whose past IO amount is smallest. However, the IO amounts may be periodically cleared in order to avoid a state in which a thread is not assigned to a user whose IO amount was temporarily large in the past.

Figure 17:
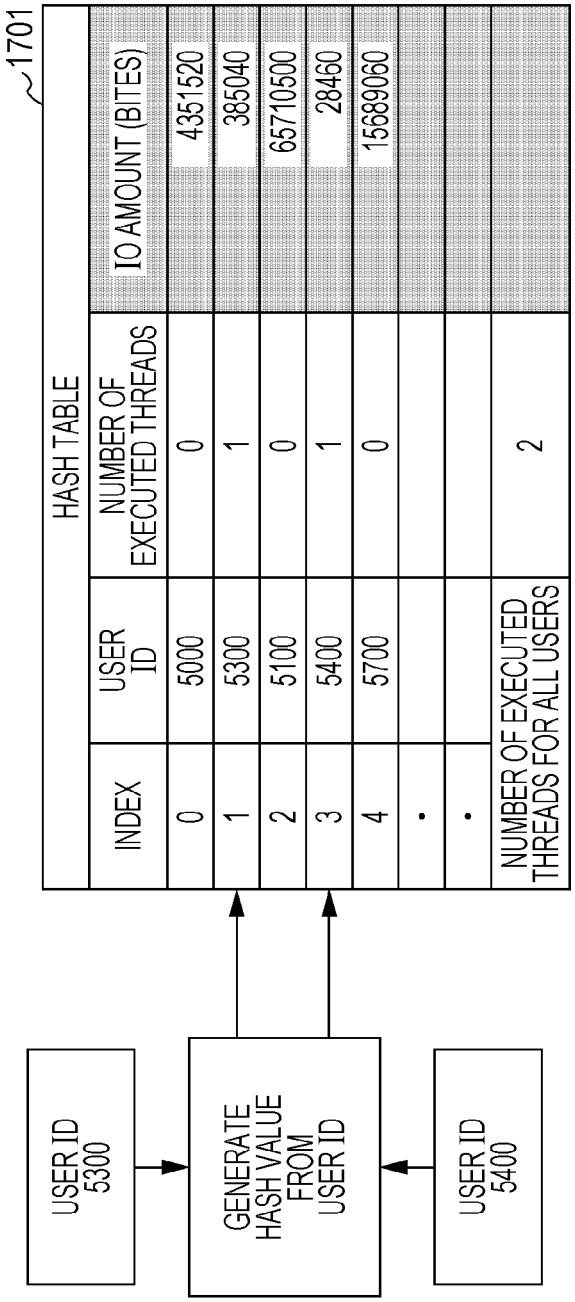
FIG. 17 is a diagram illustrating an example of a data configuration of a hash table according to the third embodiment.

FIG. 17 is a diagram illustrating an exemplary data configuration of a hash table 1701 stored on the memory of the server machine 100 by the thread assignment controller 102 as the third embodiment in which an operation of executing the control based on the IO amounts is achieved. The hash table 1701 is formed by adding an IO amount item (highlighted in gray) to the aforementioned hash table 803 illustrated in FIG. 8. Values of the IO amount item may be set on a bite basis.

Figure 18:
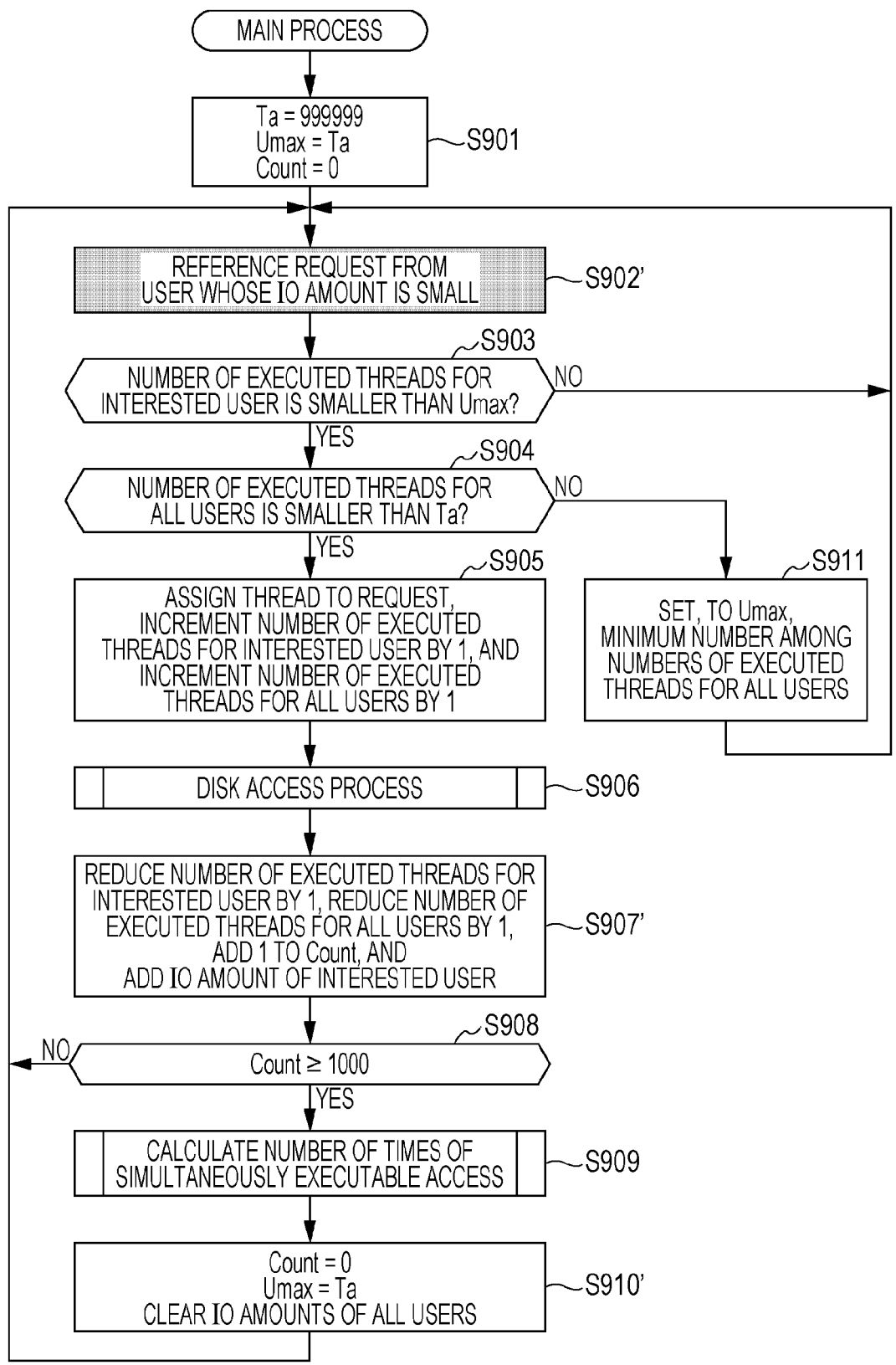
FIG. 18 is a flowchart of a detailed example of a process of controlling the assignment of threads according to the third embodiment.

FIG. 18 is a flowchart of an example of a process of assigning a thread according to a third embodiment in which an operation of executing the aforementioned control based on the IO amounts is achieved. In FIG. 18, steps of executing the same processes as the flowchart of FIG. 9 are represented by the same reference numbers as the flowchart of FIG. 9. Differences between the process depicted in the flowchart of FIG. 18 and the process depicted in the flowchart of FIG. 9 are steps S902', S907', S910' with which steps S902, S907, and S910 illustrated in FIG. 9 are replaced.

In step S902 illustrated in FIG. 9, a request within any of the request queues 704 (704A, 704B, . . . ) (exemplified in FIG. 7) generated for the users by the request receiver 101 and stored on the memory is referenced according to the round-robin method, for example. On the other hand, in step S902' illustrated in FIG. 18, a request within a request queue 704 for a user ID corresponding to an IO amount item representing the smallest IO amount is referenced in the hash table 1701 having the exemplary data configuration illustrated in FIG. 17.

In step S907' illustrated in FIG. 18, the process of step S907 illustrated in FIG. 9 and the following process are executed. In the hash table 1701 having the exemplary data configuration illustrated in FIG. 17, an IO amount of current disk access is added to a value of an IO amount item corresponding to a user ID for which the disk access process is executed.

In step S910' illustrated in FIG. 18, the process of step S910 illustrated in FIG. 9 is executed and values of IO amount items of all records for all user IDs in the hash table 1701 having the exemplary data configuration illustrated in FIG. 17 are cleared. This avoids a state in which a thread is not assigned to a user whose IO amount was temporarily large in the past.

Figure 19:
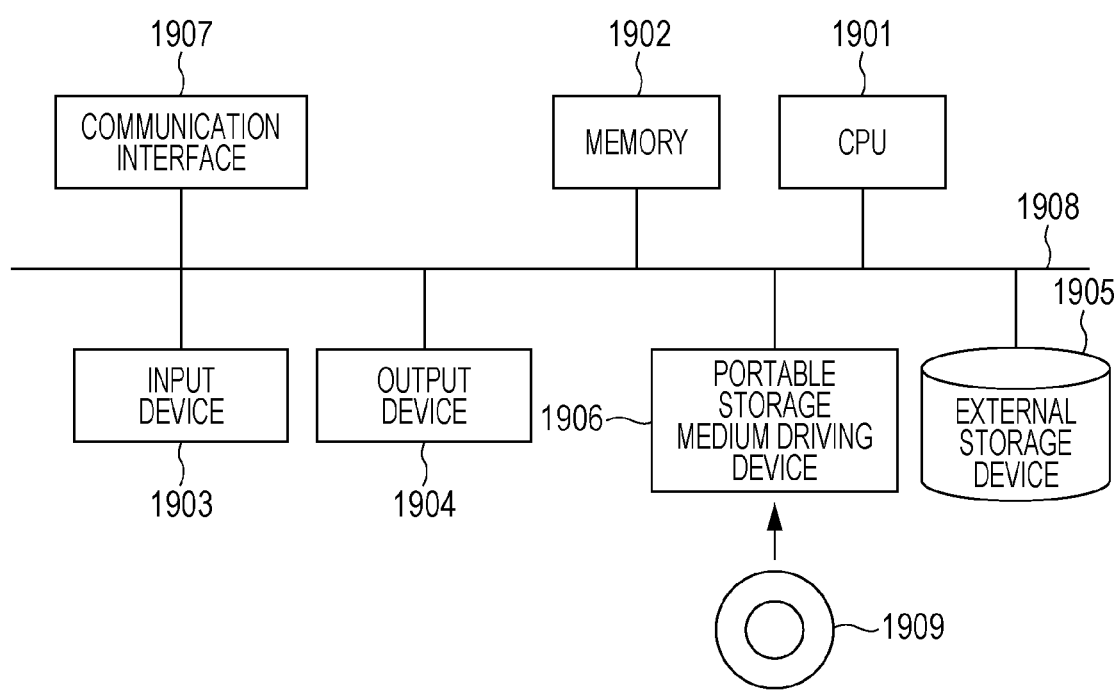
FIG. 19 is a diagram illustrating an example of a hardware configuration of a server machine that may achieve a distributed file system provided with functions illustrated in FIG. 1.

FIG. 19 is a diagram illustrating an example of a hardware configuration of the server machine 100 that achieves the distributed file system provided with the functions illustrated in FIG. 1 as a software process.

A computer illustrated in FIG. 19 includes at least one CPU 1901, a memory 1902, an input device 1903, an output device 1904, an external storage device 1905, a portable storage medium driving device 1906, and a communication interface 1907, which are connected to each other by a bus 1908. A portable storage medium 1909 is inserted into the portable storage medium driving device 1906. The configuration illustrated in FIG. 19 is an example of the server machine 100 that achieves the distributed file system illustrated in FIG. 1. The computer is not limited to this configuration.

The CPU 1901 controls the overall server machine 100. The memory 1902 is a RAM or the like and temporarily stores a program and data upon the execution of the program, the update of the data, or the like, while the program and the data are stored in the external storage device 1905 (or the portable storage medium 1909). As the data, the hash tables illustrated in FIGS. 3, 7, 8, 15, and 17, the request queues, the aggregation table 1 illustrated in FIG. 10, the aggregation table 2 illustrated in FIGS. 13A to 13C, and the like are stored in the memory 1902. The CPU 1901 reads the program into the memory 1902, executes the program, and thereby controls the overall the server machine 100.

The input device 1903 detects an input operation performed by a user through a keyboard, a mouse, or the like and notifies the CPU 1901 of a result of the detection.

The output device 1904 outputs data transmitted under control of the CPU 1901 to a display device or a printing device.

The external storage device 1905 is, for example, a hard disk storage device. The external storage device 1905 is used mainly to store various types of data and the program.

The portable storage medium driving device 1906 stores the portable storage medium 1909 such as an optical disc, an SD card, or a CompactFlash (registered trademark) card and plays an auxiliary role for the external storage device 1905.

The communication interface 1907 is a device configured to connect the server machine 100 to a communication line such as a local area network (LAN) or a wide area network (WAN).

The system according to the present embodiment is achieved by causing the CPU 1901 to execute a process program having the functions achieved by the processes depicted in the flowcharts of FIGS. 9, 11, 12, 14, 16, and 18 and the like. The program may be stored in the external storage device 1905 or the portable storage medium 1909 and distributed or acquired from the network 130 (illustrated in FIG. 1) connected to the communication interface 1907.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing device, comprising:
   a memory; and
   one or more central processing units coupled to the memory and configured to:
   control accesses to a device based on requests from users,
   record a start time of each access to the device and an end time of each access to the device,
   determine a load state of the device based on an elapsed time period from a start time to an end time, and
   limit, based on the load state of the device, a number of threads for each one of the users, the threads being concurrently executable programs to access the device based on access requests to the device from each one of the users.

2. The information processing device according to claim 1,
   wherein the one or more central processing units are configured to divide a data size of the requests from the users into a certain size causing an elapsed time period for each access to the device to be within a certain elapsed time period and of executing each access to the device,
   wherein the one or more central processing units are configured to count, for each access, a number of times of the accesses, executed in concurrent, to the device for each of certain time periods within the elapsed time period for each access and to calculate, for each access, a number of times of accesses executed concurrently within the elapsed time period for each access from a result of counting the number of times of accesses for each of the certain time periods,
   wherein the determination is to aggregate elapsed time periods for numbers of times of accesses executed concurrently using the number of times of accesses executed concurrently within an elapsed time period for each access and calculate, based on a result of aggregation, number of times of concurrently executable accesses, suppressing a delay of each access to the device, of times of accesses executed concurrently, and
   wherein the control is to limit the number of the threads that are concurrently executable programs to access the device based on the requests from each one of the users so as to ensure that the limited number of the threads does not exceed number of times of concurrently executable accesses for each one of the users.

3. The information processing device according to claim 2,
wherein the certain size divided from the data size of the requests, is each equal to a block size of a file system of the device.

4. The information processing device according to claim 2, wherein when an elapsed time period corresponding to a number of times of accesses executed concurrently is not calculated from records of elapsed time periods for accesses and records of numbers of the times of accesses executed concurrently, the determination is to calculate the elapsed time periods corresponding to a number of times of accesses executed concurrently by executing interpolation based on records of the elapsed time periods for accesses using size the certain sizes and records of numbers of the times of the accesses executed concurrently.

5. The information processing device according to claim 2,
wherein the control is to count a number of concurrently executed threads for each one of the users and number of concurrently executed threads for the users, process the requests from the users so as not to cause the counted number of the concurrently executed threads for the users to exceed a number of times of concurrently executable accesses, and reduce, based on a user for which the counted number of threads is smallest among counted numbers of concurrently executed threads for the users, a number of threads that are concurrently executed to access the device based on a request from another user when the request from the another user causes the counted number of concurrently executed threads for the users to exceed a number of concurrently executable accesses.

6. The information processing device according to claim 5,
wherein the control is to assign, to a prioritized user on a priority basis, a number of threads that are concurrently executed to access the device based on a request for the prioritized user.

7. The information processing device according to claim 5,
wherein the control is to assign, on a priority basis to a user who has accessed, in the past, data of which an amount is smaller than amounts of data accessed by each of other users in the past, a number of threads that are concurrently executed to access the device based on requests for the user.

8. A non-transitory, computer-readable recording medium having stored therein a program for causing a computer to execute a process, the process comprising:
recording, in an information processing device configured to control accesses to a device based on requests from users, a start time of each access to the device and an end time of each access to the device;
determining a load state of the device based on an elapsed time period from a start time of each access to an end time of each access; and
limiting, based on the load state of the device, a number of threads for each one of the users, the threads being concurrently executable programs to access the device based on access requests to the device from the each one of the users.

9. A method for controlling an information processing device and causing computer to execute:
recording, in the information processing device configured to control accesses to a device based on requests from users, a start time of each access to the device and an end time of each access to the device;
determining a load state of the device based on an elapsed time period from a start time to an end time; and
limiting, based on the load state of the device, a number of threads for each one of the users, the threads being concurrently executable programs to access the device based on access requests to the device from each one of the users.

* * * * *